(12) United States Patent
Yokota et al.

(10) Patent No.: US 8,723,968 B2
(45) Date of Patent: May 13, 2014

(54) IMAGE PICKUP APPARATUS

(71) Applicant: JVC Kenwood Corporation, Yokohama (JP)

(72) Inventors: Shigeru Yokota, Yokohama (JP); Masahiro Yamamoto, Yokohama (JP); Etsuo Shima, Yokohama (JP); Yuki Wada, Machida (JP); Yasufumi Nakaaki, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 4 days.

(21) Appl. No.: 13/685,781

(22) Filed: Nov. 27, 2012

(65) Prior Publication Data
US 2013/0135488 A1   May 30, 2013

(30) Foreign Application Priority Data

Nov. 30, 2011   (JP) ................................. 2011-261998

(51) Int. Cl.
*H04N 5/228* (2006.01)
*H04N 5/225* (2006.01)
*G03B 17/00* (2006.01)

(52) U.S. Cl.
USPC ............... 348/208.7; 348/208.99; 348/208.2; 348/208.4; 348/373; 348/374; 396/52; 396/55

(58) Field of Classification Search
USPC ............... 348/208.99–208.16, 335, 344–357, 348/373–376; 396/52–55, 72–88
See application file for complete search history.

(56) References Cited

U.S. PATENT DOCUMENTS

| 5,845,157 | A * | 12/1998 | Imura et al. ..................... 396/55 |
| 7,436,435 | B2 * | 10/2008 | Wada .......................... 348/208.4 |
| 7,689,109 | B2 * | 3/2010 | Noguchi ........................ 396/55 |
| 7,722,263 | B2 * | 5/2010 | Izumi et al. ................... 396/349 |
| 7,734,083 | B2 * | 6/2010 | Teramoto et al. ............. 382/147 |
| 7,920,780 | B2 * | 4/2011 | Saito ............................. 396/55 |
| 7,983,544 | B2 * | 7/2011 | Yoneoka et al. ............... 396/55 |
| 8,125,711 | B2 * | 2/2012 | Kimura ........................ 359/554 |
| 2001/0014213 | A1 * | 8/2001 | Terada ........................... 396/55 |
| 2003/0007794 | A1 * | 1/2003 | Enomoto ....................... 396/55 |
| 2003/0067544 | A1 * | 4/2003 | Wada .......................... 348/208.7 |
| 2003/0184878 | A1 * | 10/2003 | Tsuzuki ........................ 359/694 |
| 2005/0225646 | A1 * | 10/2005 | Shintani ................... 348/208.99 |
| 2006/0092285 | A1 * | 5/2006 | Shin ........................... 348/208.7 |
| 2006/0132631 | A1 * | 6/2006 | Yoshii et al. ................ 348/294 |

(Continued)

FOREIGN PATENT DOCUMENTS

JP   2007-065041 A   3/2007

*Primary Examiner* — Michael Osinski
(74) *Attorney, Agent, or Firm* — Nath, Goldberg & Meyer; Jerald L. Meyer; Stanley N. Protigal

(57) ABSTRACT

An image pickup apparatus has a camera-shake correction mechanism which performs camera-shake correction by moving an image pickup element with respect to a lens unit. The image pickup apparatus includes a z-plate provided slidably in a z-direction, an actuator for moving the plate in the z-direction, a z-shaft which guides the movement of the z-plate, and a rotating ball sandwiched between a base plate and the z-plate in a rotatable state. In a y-z plan view, an opening portion is provided between the z-shaft and the rotating ball, and the rotating ball is arranged outside the opening portion between one end and the other end of the opening portion in the z-direction.

3 Claims, 22 Drawing Sheets

(56) References Cited

U.S. PATENT DOCUMENTS

| | | |
|---|---|---|
| 2006/0146400 A1* | 7/2006 | Seo ................................ 359/368 |
| 2007/0009244 A1* | 1/2007 | Takahashi ....................... 396/55 |
| 2007/0133967 A1* | 6/2007 | Takahashi et al. .............. 396/55 |
| 2007/0279765 A1* | 12/2007 | Takahashi ...................... 359/697 |
| 2007/0292119 A1* | 12/2007 | Lee ................................ 396/55 |
| 2008/0145042 A1* | 6/2008 | Kawai et al. .................... 396/55 |
| 2008/0181594 A1* | 7/2008 | Noguchi ......................... 396/55 |
| 2009/0047009 A1* | 2/2009 | Nagano .......................... 396/55 |
| 2009/0263116 A1* | 10/2009 | Saito .............................. 396/55 |
| 2009/0310953 A1* | 12/2009 | Yoneoka et al. ................ 396/55 |
| 2010/0135648 A1* | 6/2010 | Enomoto ........................ 396/55 |
| 2010/0214426 A1* | 8/2010 | Kimura .................... 348/208.99 |
| 2011/0267692 A1* | 11/2011 | Watanabe et al. ............. 359/557 |
| 2012/0038784 A1* | 2/2012 | Irisawa et al. ............... 348/208.7 |
| 2012/0075700 A1* | 3/2012 | Ezawa .......................... 359/554 |
| 2012/0127576 A1* | 5/2012 | Tanaka .......................... 359/557 |
| 2012/0268642 A1* | 10/2012 | Kawai ........................... 348/335 |
| 2013/0155262 A1* | 6/2013 | Katoh et al. ............... 348/208.5 |
| 2013/0163973 A1* | 6/2013 | Tanaka ........................... 396/55 |
| 2013/0278785 A1* | 10/2013 | Nomura et al. .......... 348/208.11 |

* cited by examiner

FIG.8
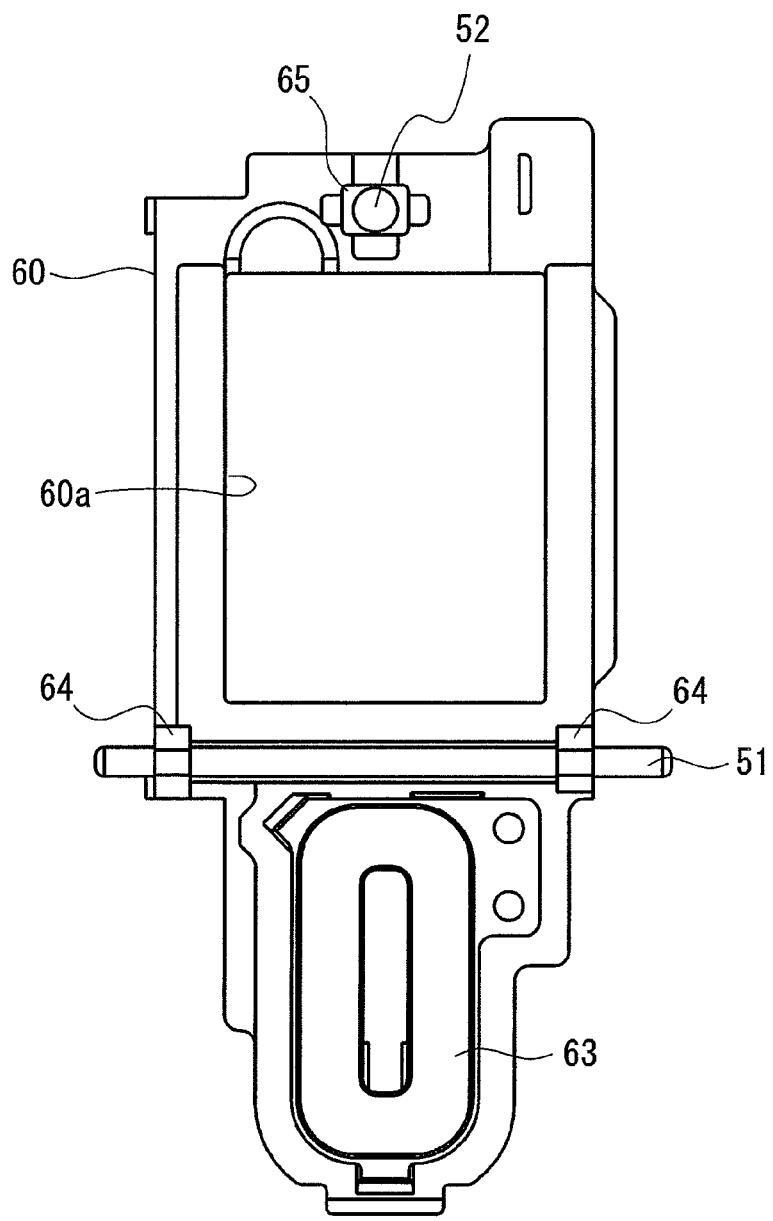
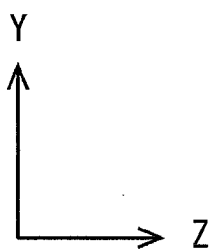

IMAGE PICKUP APPARATUS

CROSS REFERENCE TO RELATED APPLICATION

This application claims benefit of priority under 35 U.S.C. §119 to Japanese Patent Application No. 2011-261998 filed on Nov. 30, 2011, the entire contents of which are incorporated by reference herein.

BACKGROUND

The present invention relates to an image pickup apparatus and more particularly to an image pickup apparatus having a camera-shake correction function.

Some image pickup apparatuses such as a digital camera have a camera-shake correction function. For example, a method of camera-shake correction by moving an image pickup element with respect to a lens is disclosed (Patent Document 1: Japanese Patent Application Laid-Open Publication No. 2007-65041). In this type of camera-shake correction mechanism, the image pickup element is required to move at a high speed and with good linearity so as to follow camera shake.

In this type of the camera-shake correction mechanism, the image pickup element is moved planarly. For example, a slider is moved in a yaw direction with respect to a shake base plate and an image pickup element holder is moved in a pitch direction in Patent Document 1. Thus, a piezoelectric actuator for linear movement in the two directions is provided on the shake base plate and the image pickup element holder. Moreover, a shaft portion for guiding movement of the slider and the image pickup element holder is arranged orthogonally. Furthermore, at a corner part on the upper right of the plate, a ball body is sandwiched.

However, with the configuration where the ball body is sandwiched, if the actuator is operated, the plate might rotate around the ball body as an axis. Then, inclination of the shaft portion is changed, and linearity of the camera-shake correction mechanism deteriorates. Particularly, if the ball body is arranged at the corner part, the change in the inclination of the shaft portion increases. Therefore, the camera-shake correction mechanism of Patent Document 1 has a problem that linearity deteriorates and camera shake cannot be effectively corrected.

SUMMARY

The present invention was made in view of the above-described problem and has an object to provide an image pickup apparatus having a camera-shake correction mechanism which can effectively correct camera shake.

According to one aspect of the present invention, there is provided an image pickup apparatus having a camera-shake correction mechanism configured to perform camera shake correction by moving an image pickup element with respect to a lens unit, including: a base attached to the lens unit; a first plate provided slidably in a first direction with respect to the base; a first actuator configured to move the first plate in the first direction with respect to the base; a first shaft configured to connect the base and the first plate and guide movement of the first plate in the first direction; and a first rotating ball sandwiched between the base and the first plate in a rotatable state, wherein an opening portion through which a light beam traveling toward the image pickup element from the lens unit passes is provided in the base and the first plate, the opening portion is provided between the first shaft and the first rotating ball in a plan view orthogonal to the optical axis of the lens unit, and the first rotating ball is arranged outside the opening portion between one end to the other end of the opening portion in the first direction.

According to this configuration, a tilting amount of the shaft caused by rotation of the plate can be suppressed. Thus, the image pickup element can be moved with favorable linearity, and camera shake can be corrected effectively.

As described above, according to one aspect of the present invention, an image pickup apparatus having a camera-shake correction mechanism which can effectively correct camera shake can be provided.

BRIEF DESCRIPTION OF THE DRAWINGS

FIG. 8 is a front view illustrating arrangement of a z-shaft and a rotating ball with respect to the z-plate according to the embodiment of the present invention.

DETAILED DESCRIPTION

Figure 1:
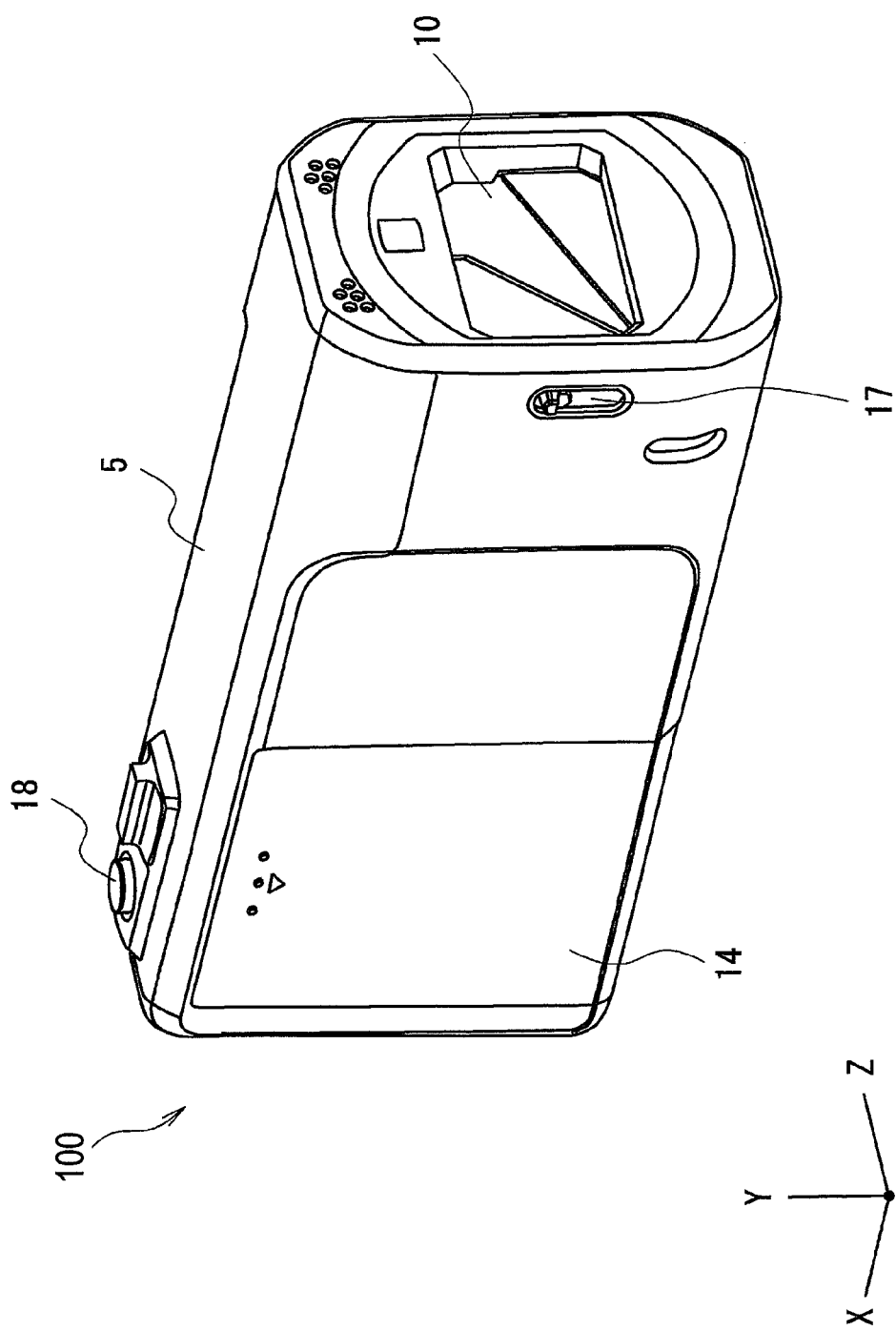
FIG. 1 is a perspective view illustrating a configuration of an image pickup apparatus according to an embodiment of the present invention when seen from a side face above.
Figure 2:
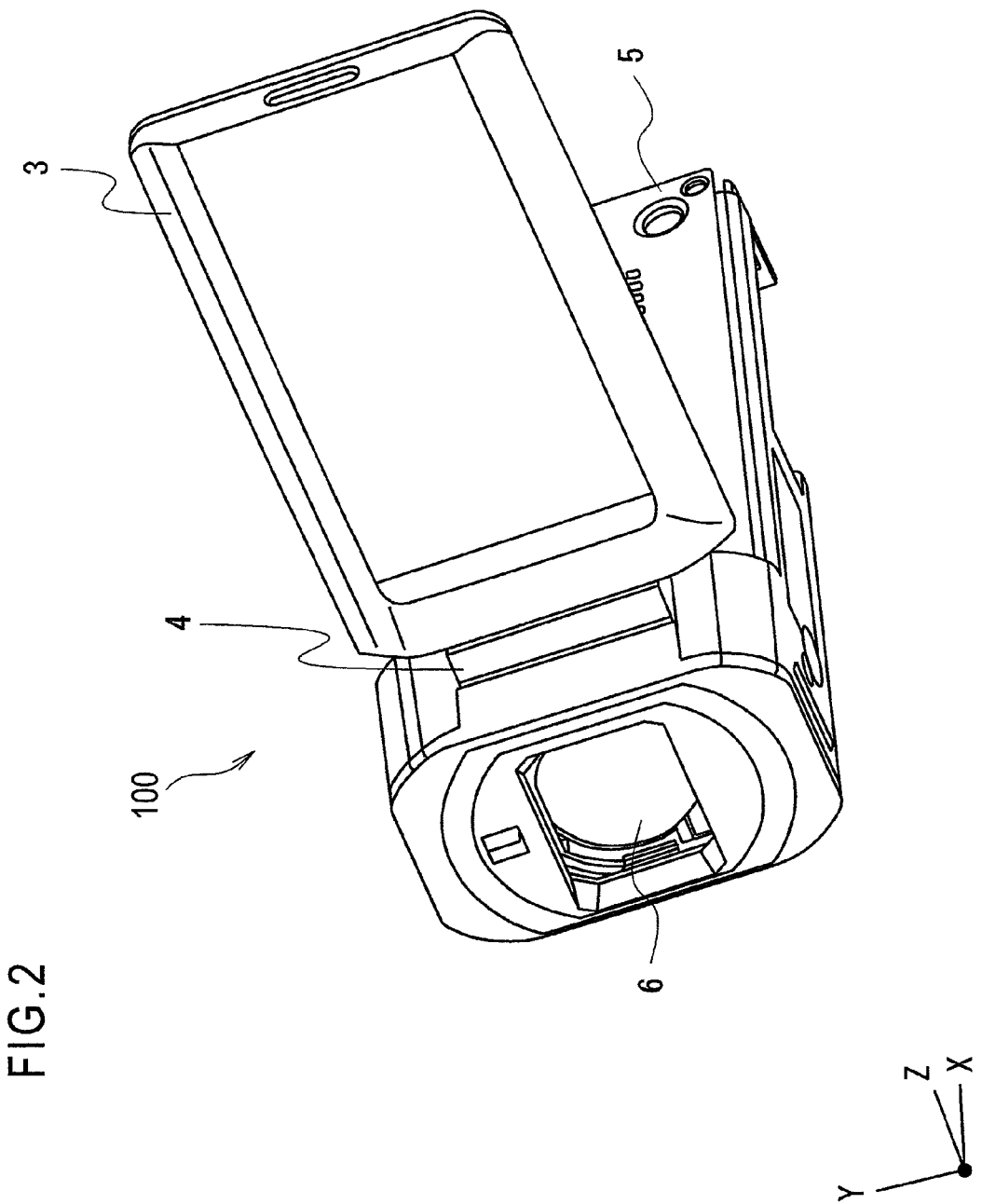
FIG. 2 is a perspective view illustrating the image pickup apparatus according to the embodiment of the present invention when seen from the side face below on the monitor portion side.

An embodiment of the present invention will be described below by referring to the attached drawings. FIGS. 1 and 2 are perspective views illustrating an entire configuration of an image pickup apparatus 100 according to this embodiment. FIG. 1 is a perspective view of the image pickup apparatus 100 when seen from the left front, and FIG. 2 is a perspective view of the image pickup apparatus 100 when seen from the right front. In the description below, an x-y-z orthogonal coordinate system as illustrated in the figures are used for clarification of the description.

Here, the x-axis indicates a longitudinal direction of the image pickup apparatus 100, the y-axis indicates a vertical direction (perpendicular direction) of the image pickup apparatus 100, and the z-axis indicates a horizontal direction (transverse direction) of the image pickup apparatus 100. That is, the x-direction is a direction in parallel with an optical axis of a lens provided in the image pickup apparatus 100, and the y-direction and the z-direction are directions perpendicular to the optical axis of the lens provided in the image pickup apparatus 100. Moreover, in a state where the user grasps the image pickup apparatus 100 with the side of a lens 6 oriented to a subject (article) side, the side opposite to the lens 6 oriented to the user side, and an operation portion 18 oriented upward, the directions are specified with respect to the user grasping the image pickup apparatus 100. That is, it is assumed that the +x-side is the rear side, the −x-side is the front side, the +y-side is the upper side, the −y-side is the lower side, the +z-side is the left side, and the −z-side is the right side. It is needless to say that the above-described directions are relative and are changed in accordance with the orientation of the image pickup apparatus 100.

(Entire Configuration)

As illustrated in FIGS. 1 and 2, the image pickup apparatus 100 has the main body portion 5, a monitor portion 3, the lens 6, a lens barrier 10, and the operation portion 18. The image pickup apparatus 100 has a camera-shake correction mechanism.

The main body portion 5 has a substantially rectangular shape and incorporates a lens barrel having the lens 6, the camera-shake correction mechanism having an image pickup element, a control circuit, a memory and the like. On a front surface of the main body portion 5, the lens barrier 10 covering the lens 6 is provided. When this lens barrier 10 is opened, the lens 6 is exposed and enters a state where imaging is possible. Moreover, on the front side on the right side surface of the main body portion 5, a lever 17 for switching opening/closing of the lens barrier 10 is provided. On an upper surface of the main body portion 5, the operation portion 18 having an operation button and the like is provided. The operation portion 18 includes a recording start button, a recording end button and the like. When the user operates the operation portion 18, an image of a subject can be taken.

As illustrated in FIG. 2, the monitor portion 3 is provided on the left side surface of the main body portion 5. The monitor portion 3 is connected to the main body portion 5 through a hinge 4. By means of the hinge 4, the monitor portion 3 is attached to the main body portion 5, capable of being opened/closed. The monitor portion 3 has a liquid crystal display for displaying a subject, stored image data, setting information and other types of information and the like. In a state where the monitor portion 3 is open, a monitor of the monitor portion 3 is arranged by being oriented to the rear side, that is, to the user side. If a touch panel function is provided, the display of the monitor portion 3 becomes a part of the operation portion.

The lens 6 guides an outside light beam to the image pickup element in the image pickup apparatus 100. In the main body portion 5, the image pickup element, the control circuit and the like are arranged. The image pickup apparatus 100 receives the light beam propagated through the lens 6 and takes an image of the subject. Moreover, on the right side surface opposite to the left side surface on which the monitor portion 3 of the main body portion 5 is provided, a battery is contained. The battery is provided detachably with respect to the main body portion 5 and supplies power to the monitor portion 3 and the image pickup element of the image pickup apparatus 100.

(Configuration of Camera-Shake Correction Mechanism)

Figure 3:
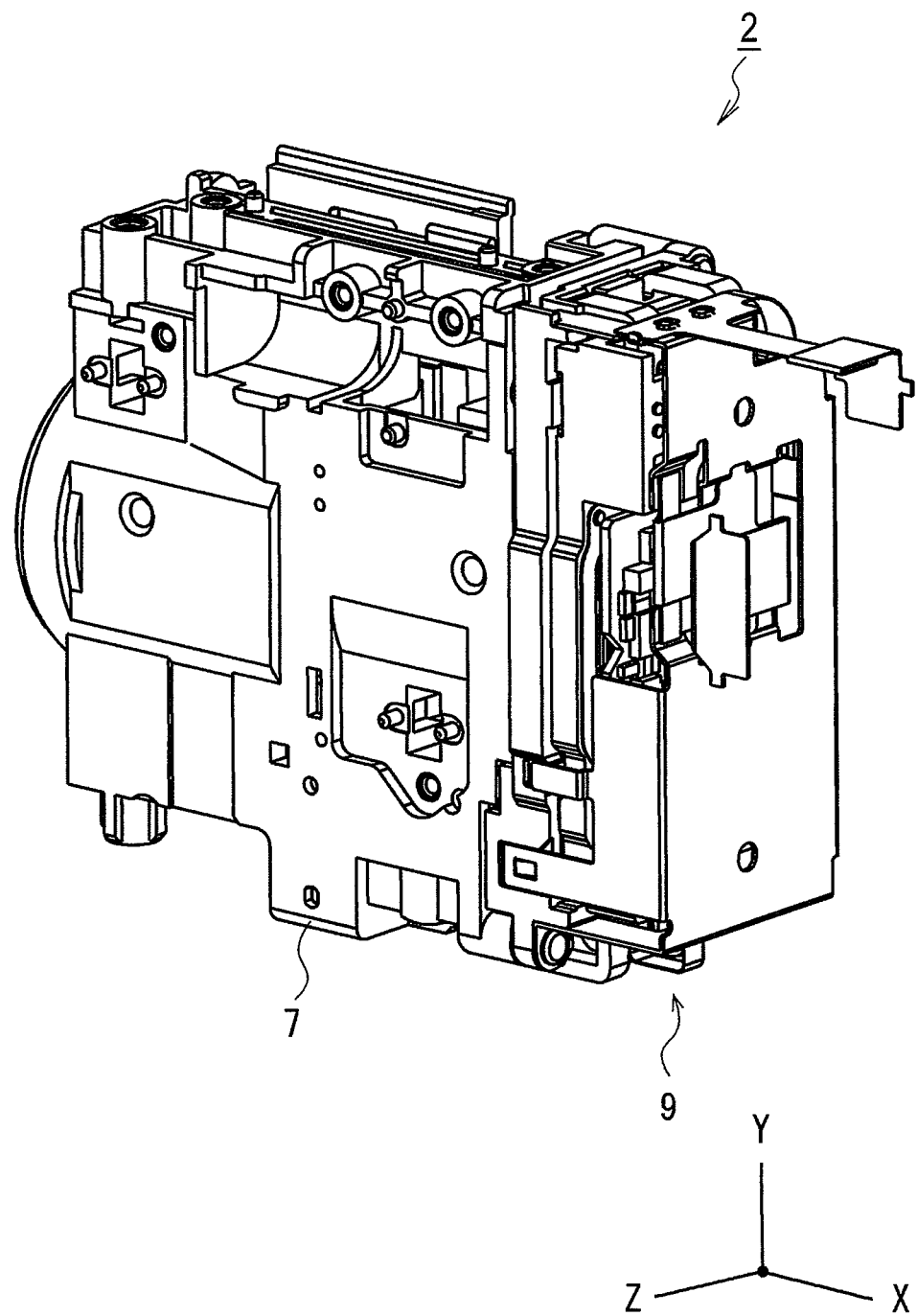
FIG. 3 is a perspective view illustrating a configuration of a camera unit incorporated in a main body portion according to the embodiment of the present invention.

Subsequently, the camera-shake correction mechanism contained in the main body portion 5 will be described by using FIGS. 3 to 7. FIG. 3 is a perspective view of a camera unit 2 contained in the main body portion 5 when seen from the rear side. As illustrated in FIG. 3, the camera unit 2 includes a lens unit 7 having a lens and a camera-shake correction mechanism 9 arranged on the rear side of the lens unit 7. The lens unit 7 has a lens barrel for holding a plurality of lenses and the like. The camera-shake correction mechanism 9 has an image pickup element such as a CMOS sensor, a CCD sensor or the like and performs camera-shake correction by moving the image pickup element with respect to the lens unit 7.

Figure 4:
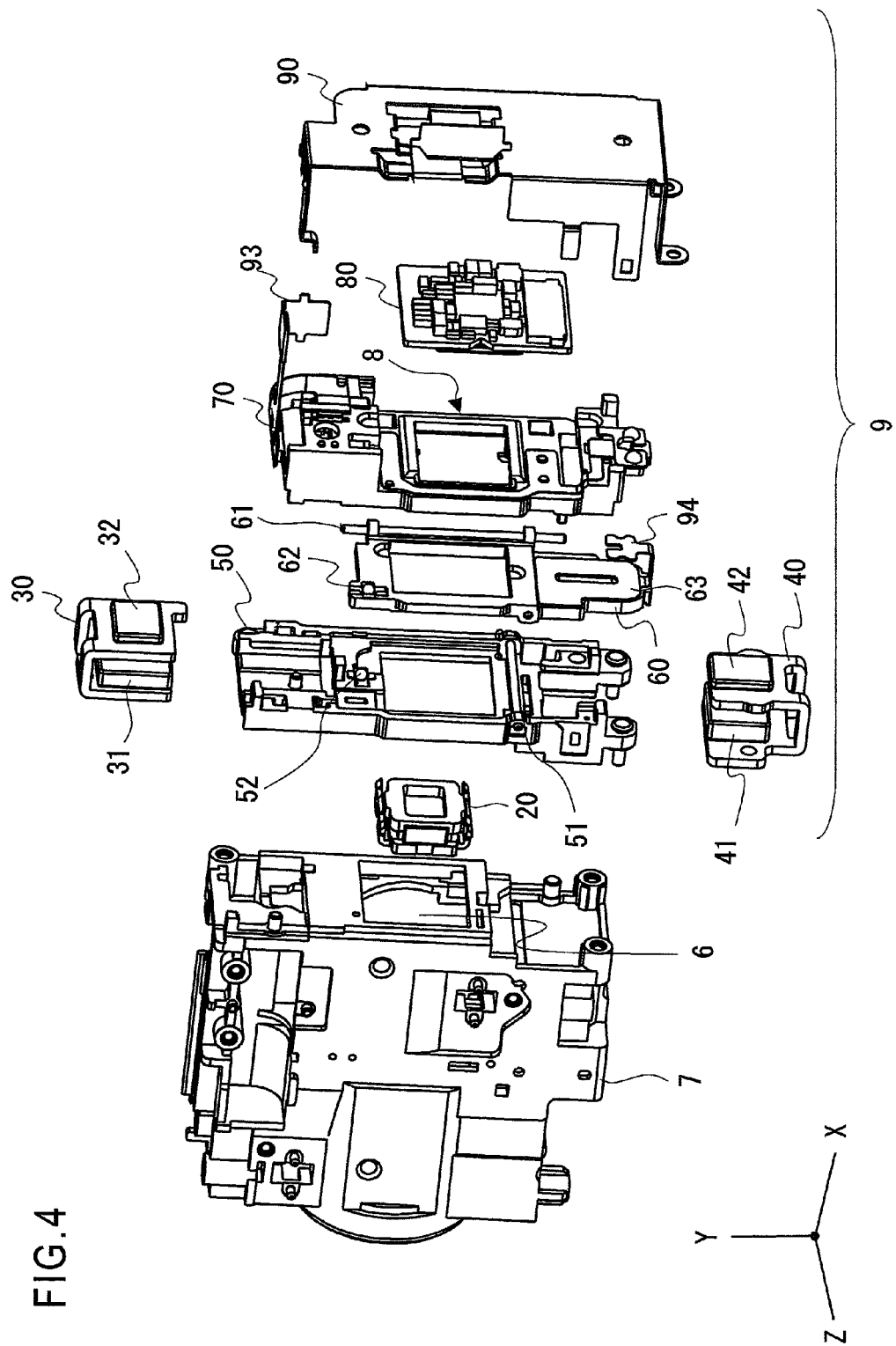
FIG. 4 is a perspective view illustrating a lens unit and a camera-shake correction mechanism provided in the camera unit according to the embodiment of the present invention in an exploded manner.

FIG. 4 is an exploded perspective view of the camera unit 2. As illustrated in FIG. 4, the camera-shake correction mechanism 9 includes a cover unit 20, an upper holder 30, a lower holder 40, a base plate 50, a z-plate 60, a y-plate 70, a sensor unit 80, and a rear cover 90.

Figure 5:
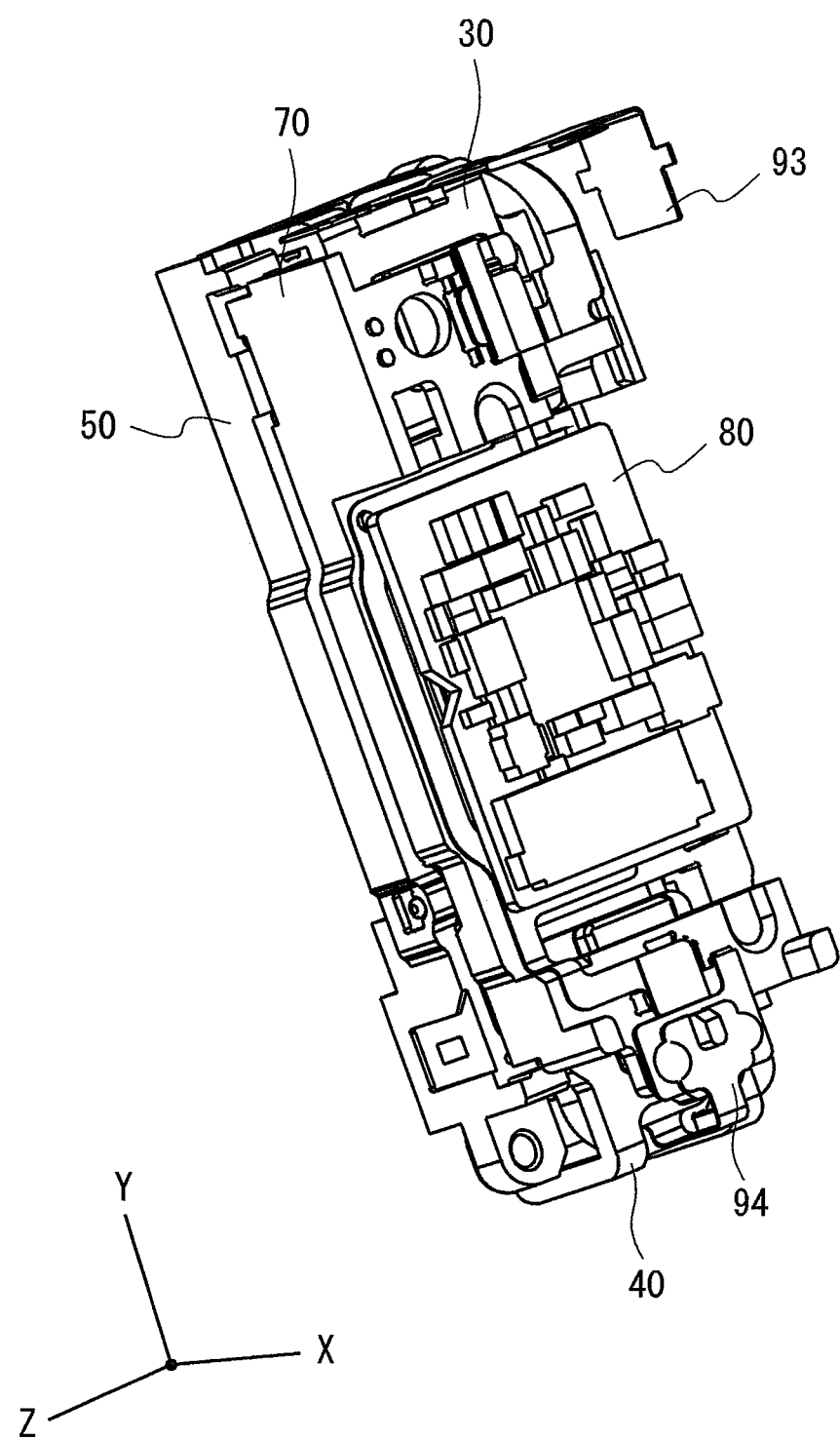
FIG. 5 is a perspective view illustrating a configuration of the camera-shake correction mechanism in a state where a rear cover is removed according to the embodiment of the present invention.
Figure 6:
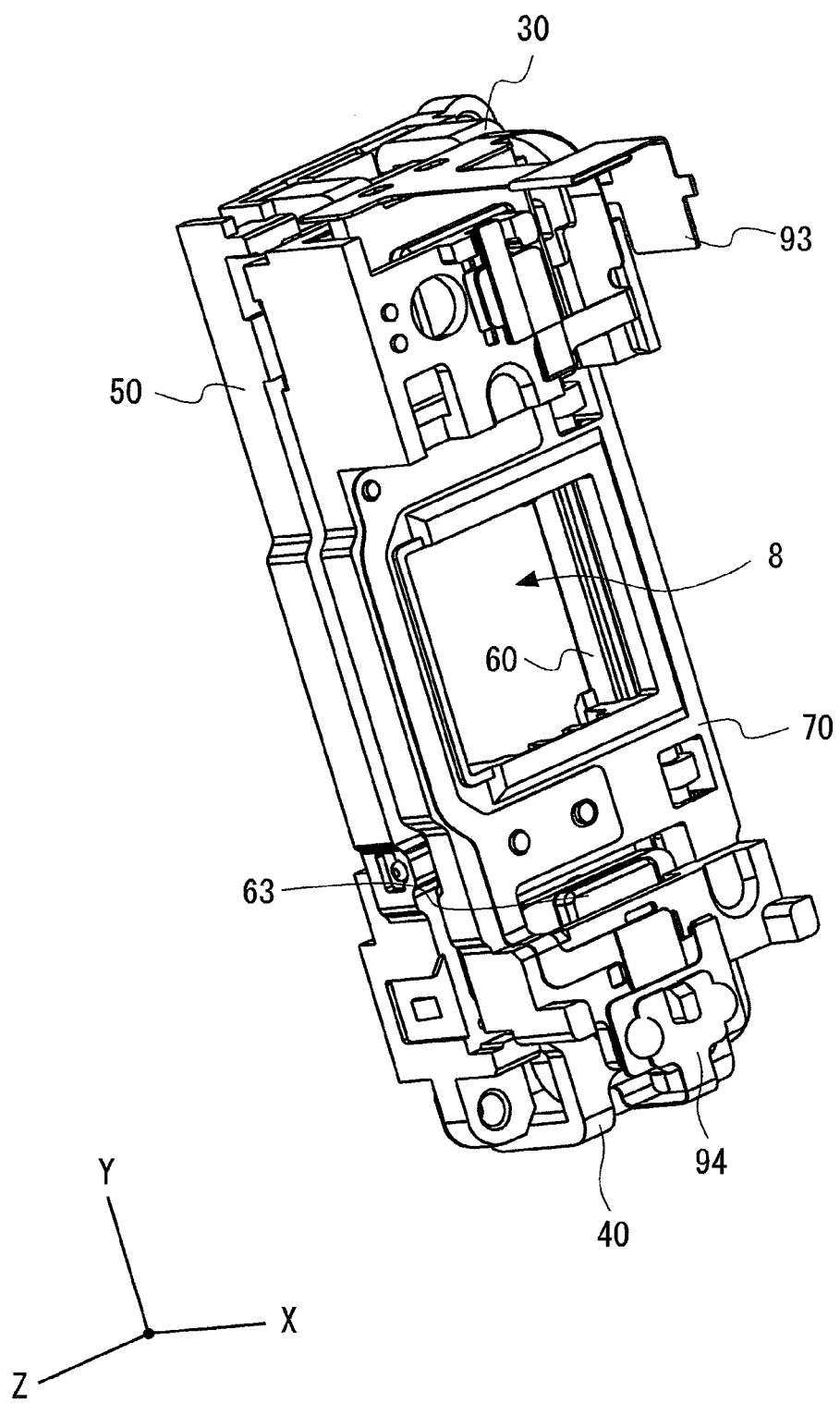
FIG. 6 is a perspective view illustrating the configuration of the camera-shake correction mechanism in a state where the rear cover and a sensor unit are removed according to the embodiment of the present invention.

FIG. 5 is a perspective view illustrating a state where the rear cover 90 of the camera-shake correction mechanism is removed when seen from the rear side. FIG. 6 is a perspective view illustrating a state where the rear cover 90 and the sensor unit 80 of the camera-shake correction mechanism 9 are removed when seen from the rear side.

As illustrated in FIG. 4, the base plate 50, the z-plate 60, and the y-plate 70 (plate portion) are arranged in this order on the rear side of the lens unit 7. The base plate 50, the z-plate 60, and the y-plate 70 are overlapped with each other, and the z-plate 60 is arranged between the base plate 50 and the y-plate 70. The base plate 50, the z-plate 60, and the y-plate 70 are formed of a resin material.

In each of the base plate 50, the z-plate 60 and the y-plate 70, an opening portion 8 through which a light beam of the lens 6 of the lens unit 7 passes is formed (See also FIG. 6). The opening portion 8 is formed having a rectangular shape. The image pickup element of the sensor unit 80 is arranged in the opening portion 8 (See also FIG. 5). Specifically, the sensor unit 80 is attached to the rear surface side of the y-plate 70.

Moreover, the cover unit 20 for protecting the image pickup element is attached to the sensor unit 80. The cover unit 20 is attached to the front side of the image pickup element of the sensor unit 80 and disposed in the opening portion 8. That is, the cover unit 20 is arranged between the lens 6 and the sensor unit 80. On the rear surface side of the sensor unit 80, the rear cover 90 is provided. The rear surface side of the sensor unit 80 is covered by the rear cover 90. To the rear cover 90, a wiring board 93 and the like which will be described later are attached.

On the upper side (+y side) of the base plate 50, the z-plate 60, and the y-plate 70, the upper holder 30 is arranged, while on the lower side (−y side), the lower holder 40 is arranged. The upper holder 30 is arranged on the upper side of the opening portion 8, while the lower holder 40 is arranged on the lower side of the opening portion 8. Each of the upper holder 30 and the lower holder 40 is attached to the base plate 50. For example, the upper holder 30 is configured to be able to be fitted in the base plate 50 from above, and the lower holder 40 is configured to be able to be fitted in the base plate 50 from below. Then, each of the upper holder 30 and the lower holder 40 is fixed to the base plate 50. Moreover, the z-plate 60 is sandwiched between the base plate 50 and the y-plate 70.

The base plate 50 is fixed with respect to the lens unit 7. The z-plate 60 is attached with respect to the base plate 50 swingably in the z-axis direction. Specifically, on the rear surface side of the base plate 50, a z-shaft 51 extending in the z-direction is provided. The base plate 50 and the z-plate 60 are connected through the z-shaft 51. The z-plate 60 slides along the z-shaft 51. On the rear surface side of the base plate 50, a rotating ball 52 is arranged. The rotating ball 52 is arranged between the base plate 50 and the z-plate 60. The rotating ball 52 is disposed in a ball receiver provided on the base plate 50 and rolls in the ball receiver in accordance with sliding of the z-plate 60. As a result, a friction force generated by movement of the z-plate 60 can be reduced.

The y-plate 70 is attached with respect to the z-plate 60 swingably in the y-axis direction. Specifically, on the rear surface side of the z-plate 60, a y-shaft 61 extending in the y-direction is provided. The y-plate 70 and the z-plate 60 are connected through the y-shaft 61. The y-plate 70 slides along the y-shaft 61. On the rear surface side of the z-plate 60, a rotating ball 62 is arranged. The rotating ball 62 is arranged between the y-plate 70 and the z-plate 60. The rotating ball 62 is disposed in a ball receiver provided on the z-plate 60 and rolls in the ball receiver in accordance with sliding of the y-plate 70. As a result, a friction force generated by movement of the y-plate 70 can be reduced.

As described above, the base plate 50 is fixed with respect to the lens unit 7, and the sensor unit 80 is fixed with respect to the y-plate 70. Therefore, if the y-plate 70 moves in the y-direction with respect to the z-plate 60, the position of the sensor unit 80 with respect to the lens 6 is changed. Moreover, if the z-plate 60 moves in the z-direction with respect to the base plate 50, the position of the sensor unit 80 with respect to the lens 6 is changed. In a y-z plane, the sensor unit 80 freely moves with respect to the lens 6. The sensor unit 80 swings in a direction to correct camera shake of the image pickup apparatus 100.

The lower holder 40 is a yoke to which a permanent magnet 41 is attached. On the other hand, a coil 63 is provided on the z-plate 60. The permanent magnet 41 and the coil 63 are arranged oppositely. That is, in the y-z plane, the permanent magnet 41 and the coil 63 are arranged so as to overlap each other. Similarly, the upper holder 30 is a yoke to which a permanent magnet 31 is attached, and this permanent magnet 31 is arranged facing a coil (not shown in FIG. 4) provided on the y-plate 70. That is, in the y-z plane, the permanent magnet 31 and the coil on the y-plate 70 are arranged so as to overlap each other. As will be described later, the permanent magnet 41 and the coil 63 are used as an actuator in the z-direction, and the permanent magnet 31 and the coil provided on the y-plate 70 are used as an actuator in the y-direction.

To the lower holder 40, a permanent magnet 42 is attached, while to the upper holder 30, a permanent magnet 32 is attached. As will be described later, the permanent magnet 42 and the permanent magnet 32 are used for position detection of the camera-shake correction mechanism 9. Moreover, to the y-plate 70, a wiring board 93 is attached, while to the z-plate 60, a wiring board 94 is attached. The wiring boards 93 and 94 are FPCs (Flexible Printed Circuit board), for example. In the wiring boards 93 and 94, a coil and wiring to an element for position detection are formed.

(Explanation of Concept of Operation Principle)

Figure 7:
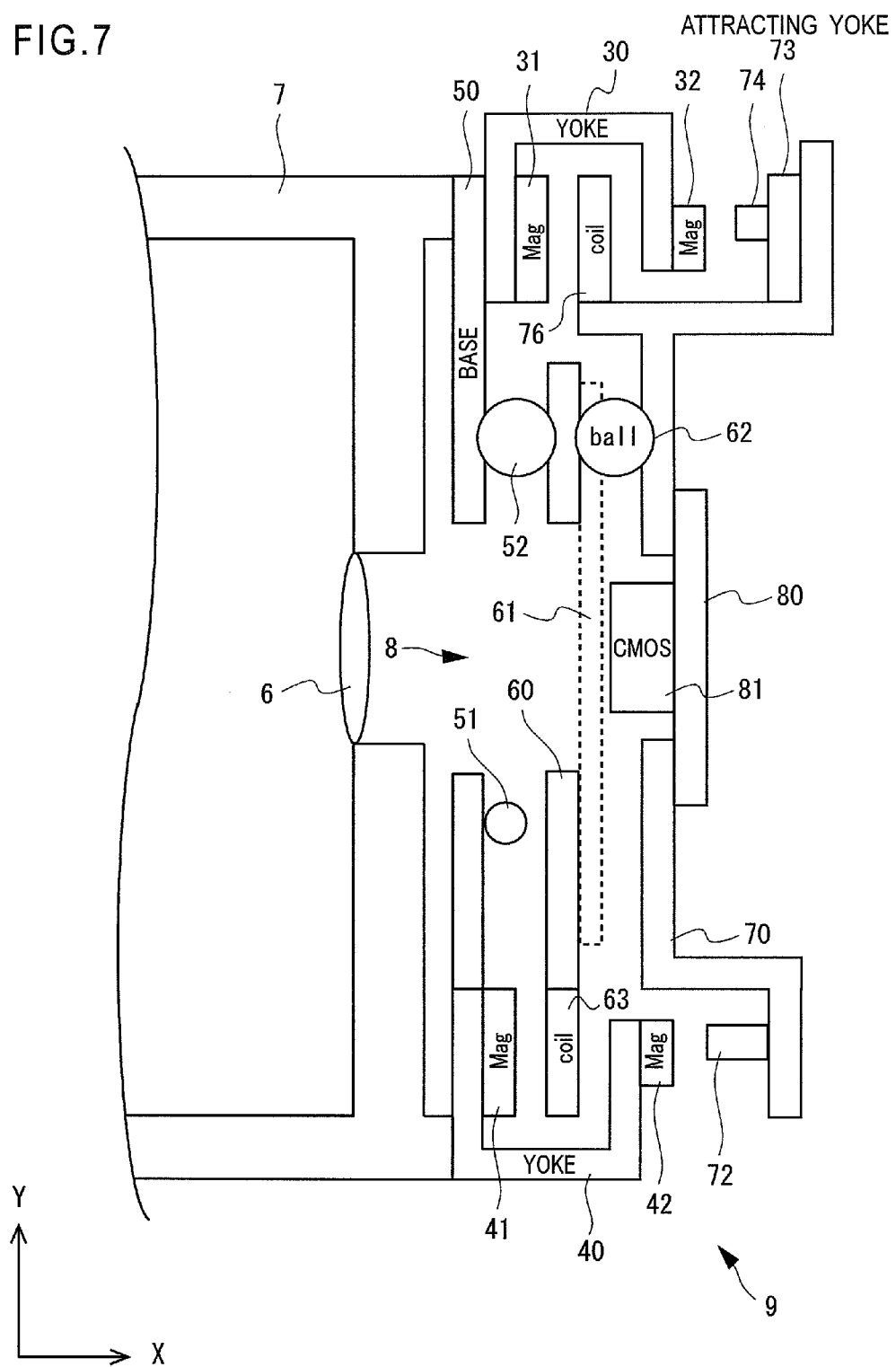
FIG. 7 is a side view conceptually illustrating the configuration of the camera-shake correction mechanism according to the embodiment of the present invention.

Subsequently, an operation of the camera-shake correction mechanism 9 will be described by using FIG. 7. FIG. 7 is a side view conceptually illustrating a configuration of the camera-shake correction mechanism. In FIG. 7, the cover unit 20 and the rear cover 90 are omitted in the illustration. First, a principle for moving an image pickup element 81 will be described. To the lens unit 7, the base plate 50 is fixed. To the base plate 50, the upper holder 30 and the lower holder 40 are attached.

The base plate 50 is coupled to the z-plate 60 through the z-shaft 51. The rotating ball 52 is interposed between the base plate 50 and the z-plate 60. The permanent magnet 41 provided on the lower holder 40 is arranged facing the coil 63 provided on the z-plate 60. Therefore, the permanent magnet 41 and the coil 63 constitute an actuator. By controlling a voltage to be supplied to the coil 63, the z-plate 60 slides in the z-direction. As described above, the permanent magnet 41 of the lower holder 40 and the coil 63 function as a motor linearly moving in the z-direction. At this time, the z-plate 60 linearly moves along the z-shaft 51. Moreover, the rotating ball 52 rolls in the ball receiver by means of the linear movement of the z-plate 60. As a result, the friction force caused by sliding is reduced, and smooth movement is realized. Since the z-shaft 51 is used, the z-plate 60 is rarely displaced in the y-direction with respect to the base plate 50. As a result, the z-plate 60 can be moved with favorable linearity.

The z-plate 60 is coupled with the y-plate 70 through the y-shaft 61. The rotating ball 62 is interposed between the y-plate 70 and the z-plate 60. The permanent magnet 31 provided on the upper holder 30 is arranged facing a coil 76 provided on the y-plate 70. Therefore, the permanent magnet 31 and the coil 76 constitute an actuator. That is, in the y-z plane, the permanent magnet 31 and the coil 76 are arranged so as to overlap each other. Thus, by controlling a voltage to be supplied to the coil 76, the y-plate 70 slides in the y-direction. As described above, the permanent magnet 31 of the upper holder 30 and the coil 76 function as a motor linearly moving in the y-direction. At this time, the y-plate 70 linearly moves along the y-shaft 61. Moreover, the rotating ball 62 rolls in the ball receiver by means of the linear movement of the y-plate 70. As a result, the friction force caused by sliding is reduced, and smooth movement is realized. Since the y-shaft 61 is used, the y-plate 70 is rarely displaced in the z-direction with respect to the base plate 50. As a result, the y-plate 70 can be moved with favorable linearity.

As described above, the z-plate 60 moves in the z-direction with respect to the base plate 50, and the y-plate 70 moves in the y-direction. To the y-plate 70, the sensor unit 80 is fixed. Moreover, since the z-plate 60 and the y-plate 70 are movably coupled, the y-plate 70 is also displaced in the z-direction in accordance with the linear movement of the z-plate 60 in the z-direction. As a result, the image pickup element 81 provided on the sensor unit 80 moves in the y-z plane. In other words, the y-plate 70 is configured to be movably coupled with the base plate 50.

Since the rotating ball 52 is arranged between the base plate 50 and the z-plate 60, a gap is generated therein. The gap communicates with a space outside the lens unit 7 through a space inside the upper holder 30. Similarly, a gap between the z-plate 60 and the y-plate 70 also communicates with the space outside the lens unit 7.

Moreover, the opening portion 8 penetrating the base plate 50, the z-plate 60, and the y-plate 70 is arranged on the rear side of the lens 6. Therefore, a light beam refracted by the lens 6 passes through the opening portion 8 and enters the image pickup element 81. The image pickup element 81 freely moves within the opening portion 8. Displacement of the image pickup element 81 in the y-z directions caused by camera shake is detected by a sensor provided in the image pickup apparatus 100 and a current to be supplied to the coils 63 and 76 is controlled in accordance with the displacement. Thus, the camera shake correction can be performed.

A position of the y-plate 70 is detected by hall elements 72 and 74. Then, on the basis of a result of the position detection, a voltage to be supplied to the coil 76 and the coil 63 is controlled. The camera-shake correction mechanism 9 can be feedback-controlled, and the camera shake correction can be effectively performed. A configuration for position detection of the image pickup element 81 will be described below.

For the position detection, the permanent magnet 32 and the permanent magnet 42 are used. For example, the permanent magnet 32 is fixed to the upper holder 30 so as to face the hall element 74. In the y-z plan view, the hall element 74 and the permanent magnet 32 are arranged so as to overlap each other. Moreover, the hall element 74 is fixed to the y-plate 70 via an attracting yoke 73.

The hall element 74 detects a magnetic field generated by the permanent magnet 32. If relative positions of the permanent magnet 32 and the hall element 74 are changed, a detection result of the hall element 74 is changed. Therefore, a displacement amount of the y-plate 70 with respect to the base plate 50 can be detected by an output signal output from the hall element 74. In other words, the hall element 74 detects the position of the image pickup element 81.

Similarly, the permanent magnet 42 is attached to the lower holder 40 so as to face the hall element 72. In the y-z plan view, the hall element 72 and the permanent magnet 42 are arranged so as to overlap each other. The hall element 72 detects a magnetic field generated by the permanent magnet 42. If relative positions of the permanent magnet 42 and the hall element 72 are changed, a detection result of the hall element 72 is changed. Therefore, a displacement amount of the y-plate 70 with respect to the base plate 50 can be detected by an output signal output from the hall element 72. In other words, the hall element 72 detects the position of the image pickup element 81.

As described above, the hall elements 72 and 74 detect the relative position of the image pickup element 81 with respect to the base plate 50. For example, one of the hall elements 72 and 74 detects a position in the y-direction and the other detects the position in the z-direction. That is, each of the hall elements 72 and 74 is used as a linear position sensor. The voltage to be supplied to the coil 63 and the coil 76 is controlled by output signals from the hall elements 72 and 74. As a result, the image pickup element 81 can be feedback-controlled, and camera shake correction can be performed more effectively.

Moreover, the permanent magnet 32 generates a magnetic force for attracting the attracting yoke 73. By means of this magnetic force, the y-plate 70 is attracted to the base plate 50. As a result, the rotating balls 52 and 62 are held between the plates (linear guide by the shaft and the rotating ball).

Figure 9:
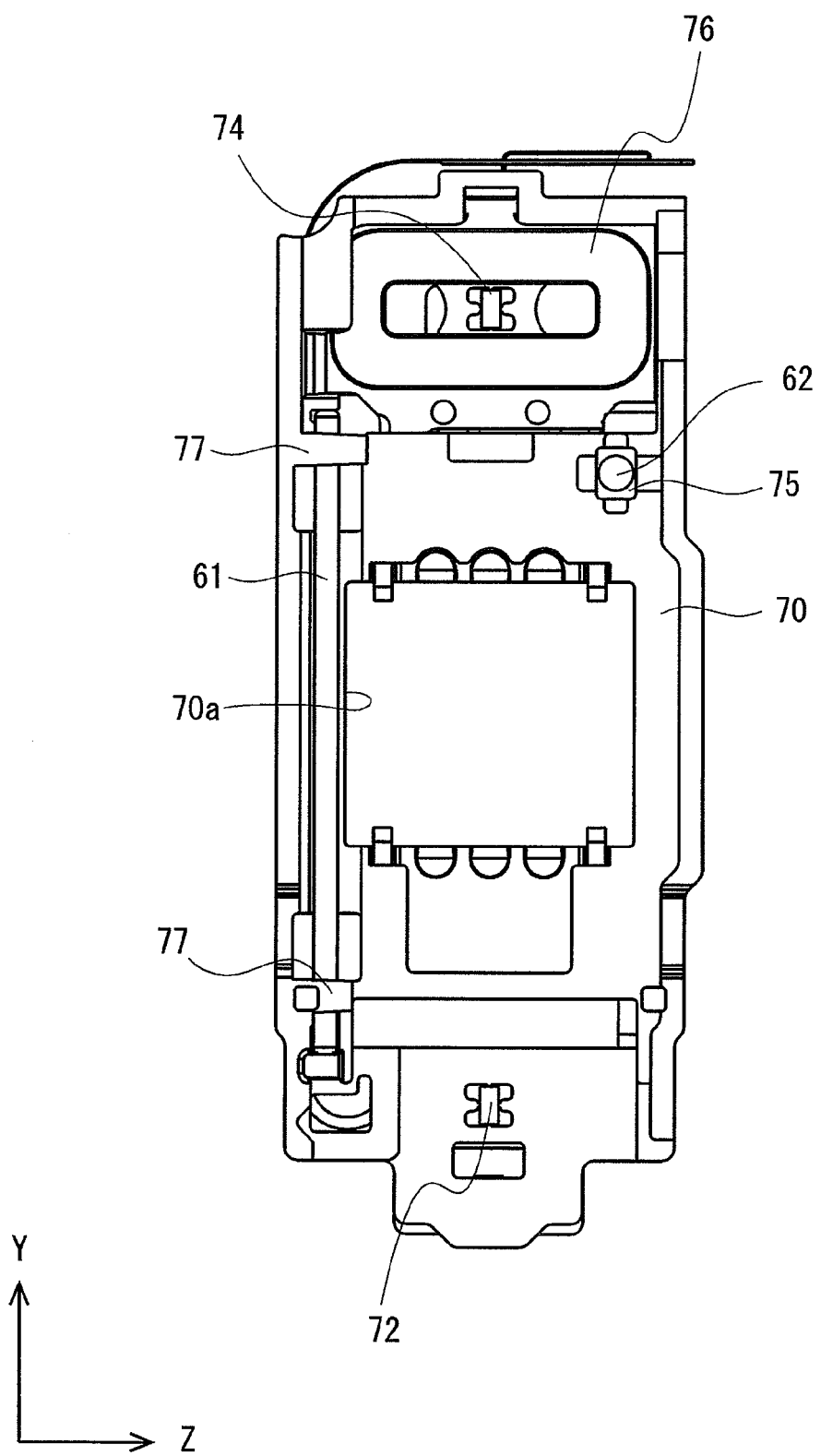
FIG. 9 is a front view illustrating arrangement of a y-shaft and a rotating ball with respect to the y-plate according to the embodiment of the present invention.

As described above, the z-plate 60 and the y-plate 70 are made to slide in the z-direction and the y-direction, respectively, and thereby the camera shake correction is performed. A guide mechanism for guiding the sliding by using the y-shaft 61, the z-shaft 51, the rotating ball 52, and the rotating ball 62 will be described below. FIG. 8 is a front view of a configuration of the z-plate 60 and illustrates the z-shaft 51 and the rotating ball 52 together. FIG. 9 is a front view of a configuration of the y-plate 70 and illustrates the y-shaft 61 and the rotating ball 62 together.

As illustrated in FIG. 8, a rectangular opening portion 60a is provided at the center part of the z-plate 60, and this opening portion 60a corresponds to the above-described opening portion 8. Moreover, in the lower side (−y side) of the opening position 60a, two shaft holes 64 are provided. The two shaft holes 64 are aligned in the z-direction. In the z-direction, one of the two shaft holes 64 is arranged on the right side of the opening portion 60a, while the other is arranged on the left side of the opening portion 60a.

Into the two shaft holes 64, the z-shaft 51 in the z-direction is inserted. It is needless to say that the shaft holes 64 are arranged so that the z-shaft 51 does not overlap the opening portion 60a. The z-shaft 51 is arranged with a shift in the −y direction from the opening portion 60a. The z-shaft 51 is longer than the opening portion 60a and protrudes from the opening portion 60a in the z-direction. In the rear surface side of the base plate 50, a shaft hole through which the z-shaft 51 is to be inserted is similarly formed, and the z-shaft 51 is fixed to the base plate 50. As a result, the base plate 50 and the z-plate 60 are coupled with each other through the z-shaft 51.

Moreover, on the upper side (+y side) of the opening portion 60a, a ball receiver 65 is formed. For example, the ball receiver 65 is formed by forming a tapered dent (V-groove) in the z-plate 60. In the ball receiver 65, the rotating ball 52 is disposed. Though not shown, a similar ball receiver is formed at a position of the rotating ball 52 also on the rear surface side of the base plate 50. In the ball receiver 65, the rotating ball 52 is sandwiched between the base plate 50 and the z-plate 60. The rotating ball 52 is rotatably held in the ball receiver 65 between the base plate 50 and the Z-plate 60. Moreover, on the lower side of the z-shaft 51, a coil 63 for driving the z-plate 60 is provided. The coil 63 turns around the x-axis as a winding shaft. Then, the actuator having the coil 63 moves the z-plate 60 in the z-direction.

As illustrated in FIG. 9, a rectangular opening portion 70a is provided at the center part of the y-plate 70, and this opening portion 70a corresponds to the above-described opening portion 8. Therefore, the opening portion 60a and the opening portion 70a are arranged so as to overlap each other. Moreover, on the −z side of the opening portion 70a, two shaft holes 77 are provided. The two shaft holes 77 are aligned in the y-direction. In the y-direction, one of the two shaft holes 77 is arranged on the upper side of the opening portion 70a, while the other is arranged on the lower side of the opening portion 70a.

Into the shaft holes 77, the y-shaft 61 in the y-direction is inserted. It is needless to say that the shaft holes 77 are arranged so that the y-shaft 61 does not overlap the opening portion 70a. The y-shaft 61 is arranged with a shift from the opening portion 70a. The y-shaft 61 is longer than the opening portion 70a and protrudes from the opening portion 70a in the y-direction. In the rear surface side of the z-plate 60, a shaft hole through which the y-shaft 61 is to be inserted is similarly formed, and the y-shaft 61 is fixed. As a result, the y-plate 70 and the z-plate 60 are coupled with each other through the y-shaft 61.

Moreover, on the upper side (+y side) of the opening portion 70a, a ball receiver 75 is formed. For example, the ball receiver 75 is formed by forming a tapered dent (V-groove) in the y-plate 70. In the ball receiver 75, the rotating ball 62 is disposed. Though not shown, a similar ball receiver is formed at a position of the rotating ball 62 also on the rear surface side of the z-plate 60. The rotating ball 62 is sandwiched between the y-plate 70 and the z-plate 60. The rotating ball 62 is rotatably held in the ball receiver 75 between the y-plate 70 and the Z-plate 60. Moreover, on the upper side of the opening 60a, a coil 76 for droving the y-plate 70 is provided. The coil 76 turns around the x-axis as a winding shaft. Then, the actuator having the coil 76 moves the y-plate 70 in the y-direction.

As described above, both the shaft and the rotating ball are used in order to guide sliding in one direction. Thus, the plate can be moved with favorable linearity. For example, if only the rotating ball is used without using the shaft, at least three rotating balls need to be arranged between the plates. In this case, since the image pickup element 81 rotates using one rotating ball as an axis, linearity deteriorates. Moreover, plural mechanisms for holding the plate need to be arranged.

On the other hand, if only the shaft is used without using the rotating ball, the shaft is configured to be arranged on the both sides of the opening portion. In order to insert two shafts through the shaft hole, a gap between the shaft hole and the shafts needs to be wide. That is, the linearity deteriorates by an amount corresponding to the gap between the shaft hole and the shafts. By using both the shaft and the rotating ball as in this embodiment, the plate can be moved with favorable linearity. As a result, camera shake can be corrected effectively.

Figure 10:
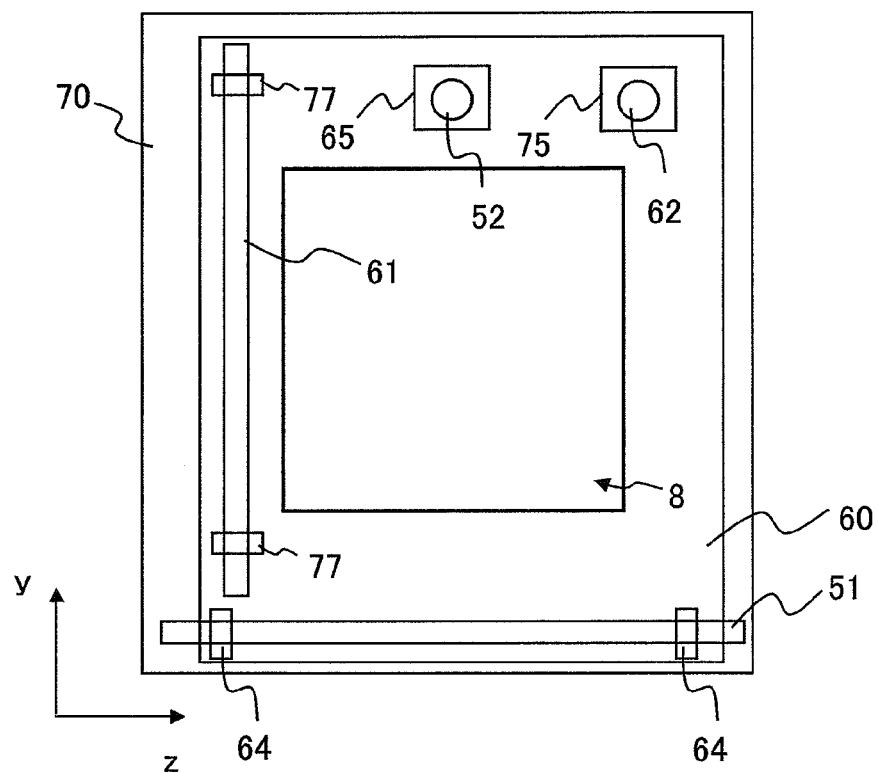
FIG. 10 is a front view schematically illustrating an arrangement example of the shaft and the rotating ball according to the embodiment of the present invention.

Here, arrangement of the rotating ball 62 and the rotating ball 52 will be described by using FIG. 10. FIG. 10 is a diagram schematically illustrating planar arrangement of the rotating ball 62 and the rotating ball 52 with respect to the z-shaft 51 and the y-shaft 61. As illustrated in FIG. 10, the rotating ball 52 is arranged on the upper side of the opening portion 8, and the z-shaft 51 is arranged on the lower side of the opening portion 8. In other words, in the y-direction, the opening portion 8 is arranged between the rotating ball 52 and the z-shaft 51. The rotating ball 52 is arranged at a position corresponding to the vicinity of the center of the z-shaft 51 in the z-direction. With this configuration, linearity in the z-direction can be improved. Moreover, the y-shaft 61 is arranged on the left side of the opening portion 8, and the rotating ball 62 is arranged on the upper right of the opening portion 8.

In the z-direction, the rotating ball 52 is arranged at a position corresponding to the vicinity of the center of the opening portion 8. Specifically, the rotating ball 52 is arranged outside the opening portion 8 between one end (left end) and the other end (right end) of the opening portion 8 in the z-direction. As a result, a tilting amount of the z-shaft 51 caused by rotation of the z-plate 60 can be reduced. Thus, the image pickup element 81 can be moved with favorable linearity.

Therefore, the rotating ball 62 and the rotating ball 52 are arranged on one end side of the opening portion (on the upper side in the present embodiment). With this configuration, it is only necessary to generate an attractive force to sandwich the rotating ball between the plates only on the upper side of the opening portion 8. That is, since there is no more need to generate an attractive force on the lower side of the opening portion 8, the number of components can be reduced. For example, a permanent magnet or a yoke for generating the attractive force is no longer needed. Moreover, by means of the reduction of the number of components, an assembling process can be simplified, and further cost reduction can be realized. Moreover, since the rotating ball 52 is arranged at a position corresponding to the vicinity of the center of the z-shaft 51 in the z-direction, linearity in the z-direction can be improved.

Figure 11:
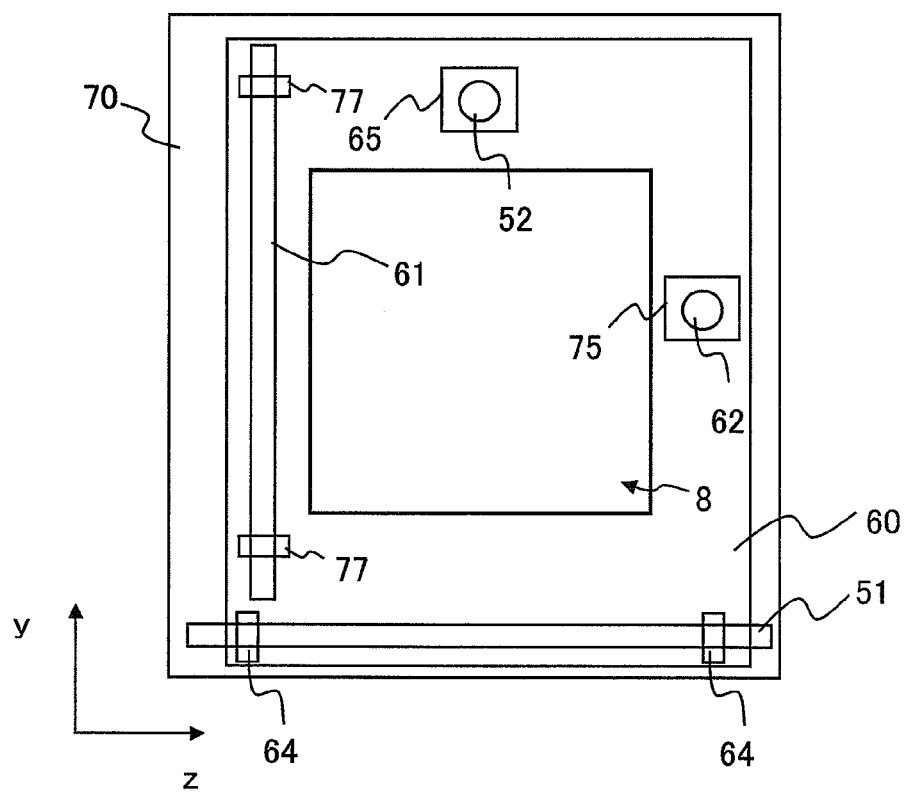
FIG. 11 is a front view schematically illustrating another arrangement example of the shaft and the rotating ball according to the embodiment of the present invention.

Moreover, another arrangement example of the rotating ball 62 will be described by using FIG. 11. FIG. 11 is a y-z front view illustrating another arrangement example of the z-shaft 51, the y-shaft 61, the rotating ball 52, and the rotating ball 62. In the arrangement example illustrated in FIG. 11, the positions of the rotating ball 62 and its ball receiver are different from those in the arrangement example illustrated in FIG. 10. Here, the rotating ball 62 is arranged at a position corresponding to the vicinity of the center of the opening portion 8 in the y-direction. That is, the rotating ball 62 is arranged outside the opening portion 8 in the vicinity of the center between one end (upper end) and the other end (lower end) of the opening portion 8 in the y-direction. As a result, linearity of movement in the y-direction can be improved. Moreover, the similar configuration is provided also in the z-direction. That is, the rotating ball 52 is arranged outside the opening portion 8 in the vicinity of the center between one end (left end) and the other end (right end) of the opening portion 8 in the z-direction. As a result, linearity of movement in the z-direction can be improved.

As described above, the rotating ball 52 is arranged in the vicinity of the center of the opening portion 8 in the z-direction, and the rotating ball 62 is arranged in the vicinity of the center of the opening portion 8 in the y-direction. With this configuration, an influence by the rotation can be reduced in the movement in the y-direction and the movement in the z-direction. As a result, the image pickup element can be moved with favorable linearity. Moreover, the rotating ball 52 and the rotating ball 62 are arranged with a shift in the y-z plane so that the positions are different. As a result, since there is no more need to provide a ball receiver at the same positions on the front and back of the z-plate 60, assembling can be performed easily. In addition to the configuration in FIG. 10, the rotating ball 62 is arranged between that and the opening portion 8 in the y-direction. As a result, the tilting amount of the y-shaft 61 caused by the rotation of the y-plate 70 can be made smaller. Thus, the image pickup element 81 can be moved with favorable linearity.

(Position Detection of Camera-Shake Correction Mechanism)

As described above, the hall elements 72 and 74 detect the position of the y-plate 70, and thereby feedback control is executed. This position detection will be described below.

Figure 12:
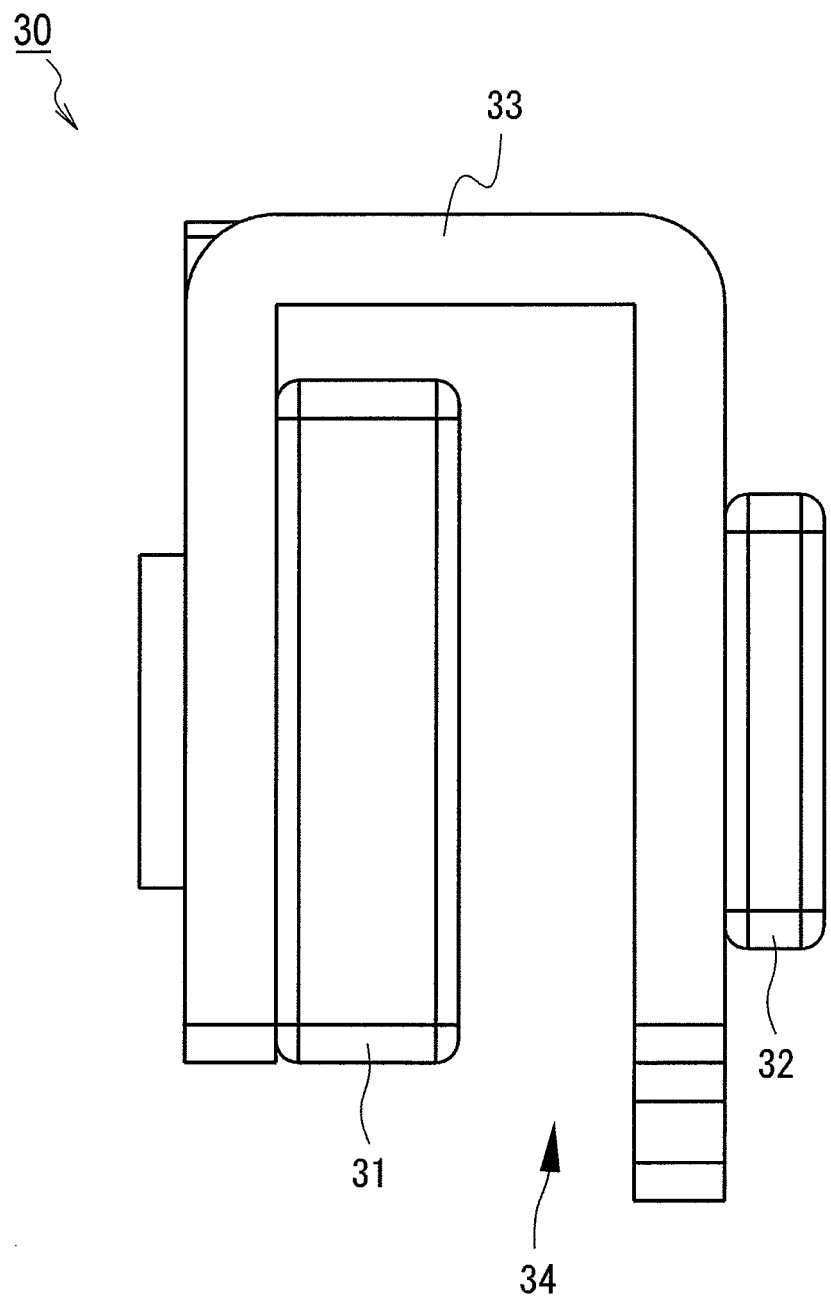
FIG. 12 is a side view illustrating a configuration of an upper holder according to the embodiment of the present invention.

FIG. 12 is a side view illustrating a configuration of the upper holder 30. The upper holder 30 has the permanent magnet 31, the permanent magnet 32, and a yoke 33. The permanent magnet 31 and the permanent magnet 32 are fixed to the yoke 33. The yoke 33 is formed having a substantially U-shape in an x-y plan view. Here, it is assumed that a space inside the yoke 33 is a recess portion 34. The recess portion 34 is arranged by being oriented downward. In this recess portion 34, the permanent magnet 31 is arranged. The magnetic field generated by the permanent magnet 31 is closed between that and the yoke 33. The above-described coil 76 is inserted into the recess portion 34. As a result, since the coil 76 and the permanent magnet 31 are arranged facing each other, they function as a motor. Moreover, the permanent magnet 32 for position detection is attached to the end surface on the +x side of the yoke 33. The magnetic force of the permanent magnet 32 becomes an attractive force for attracting the y-plate 70.

Figure 13:
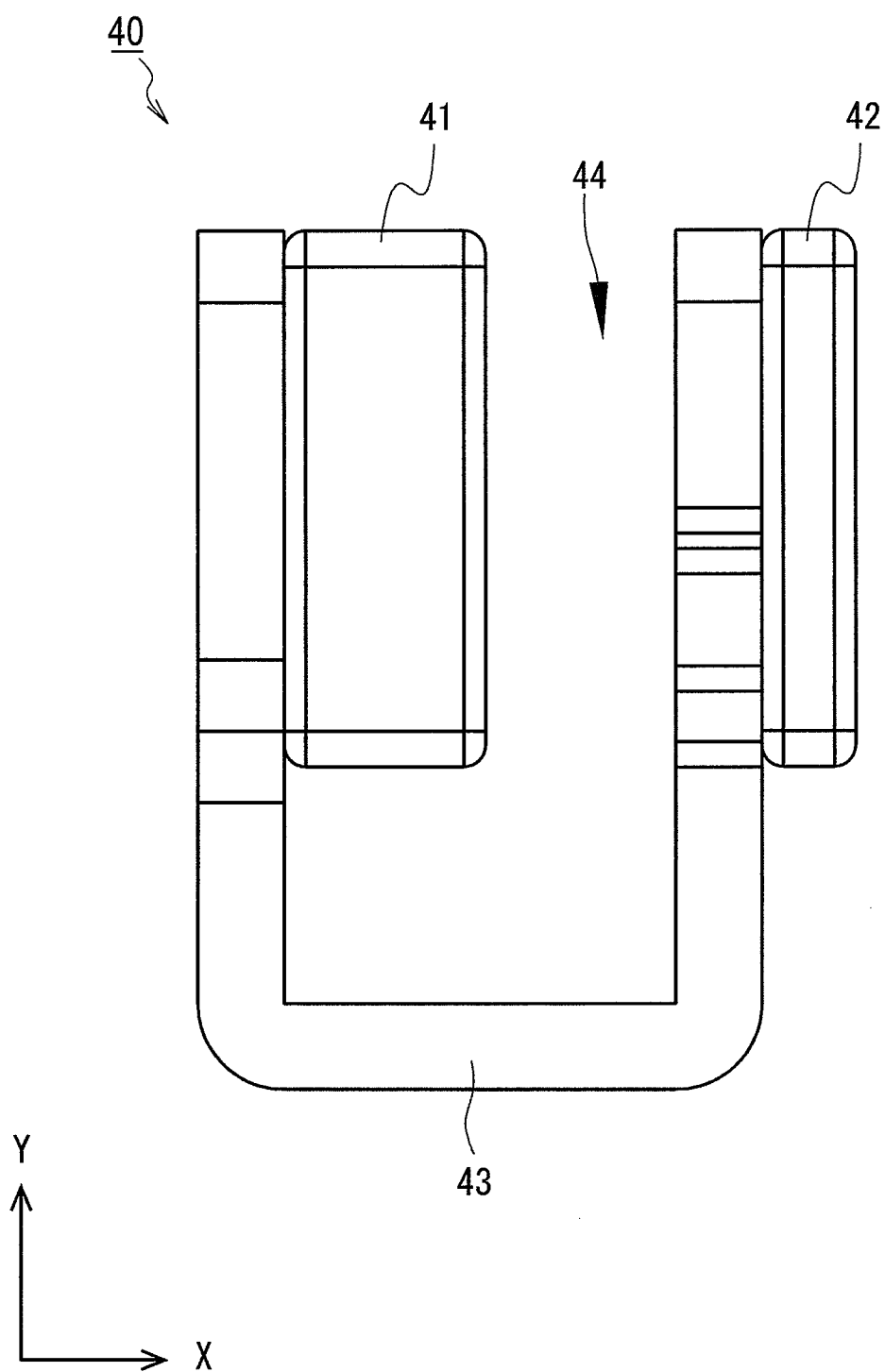
FIG. 13 is a side view illustrating a configuration of a lower holder according to the embodiment of the present invention.

FIG. 13 is a side view illustrating a configuration of the lower holder 40. The lower holder 40 has the permanent magnet 41, the permanent magnet 42, and a yoke 43. The permanent magnet 41 and the permanent magnet 42 are fixed to the yoke 43. The yoke 43 is fainted having a substantially U-shape in the x-y plan view. Here, it is assumed that a space inside the yoke 43 is a recess portion 44. The recess portion 44 is arranged by being oriented upward. In this recess portion 44, the permanent magnet 41 is arranged. The magnetic field generated by the permanent magnet 41 is closed between that and the yoke 43. The above-described coil 63 is inserted into the recess portion 44. As a result, since the coil 63 and the permanent magnet 41 are arranged facing each other, they function as a motor. Moreover, the permanent magnet 42 for position detection is attached to the end surface on the +x side of the yoke 43.

Figure 14:
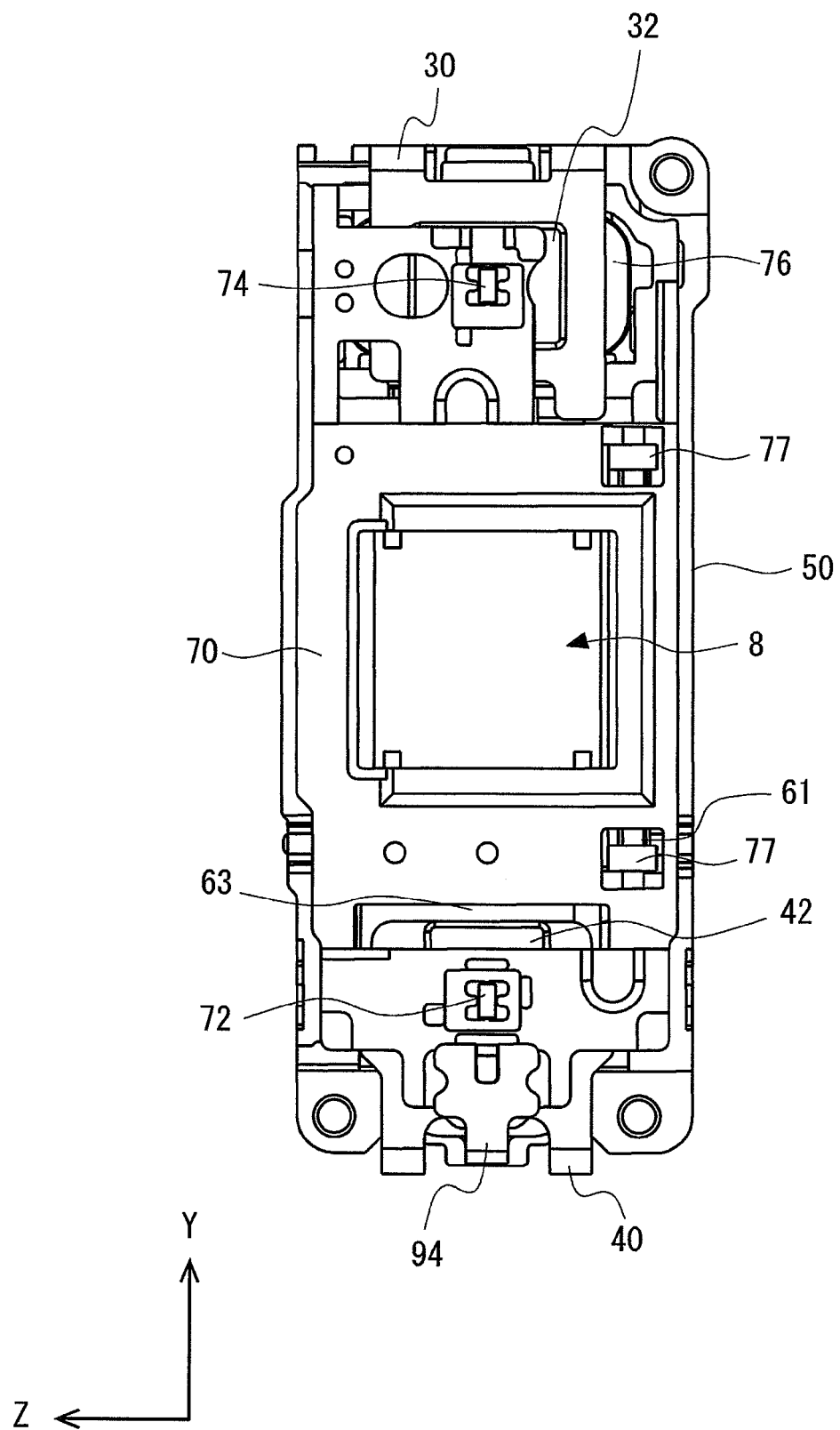
FIG. 14 is a rear view for explaining a position detection mechanism of the camera-shake correction mechanism according to the embodiment of the present invention.
Figure 15:
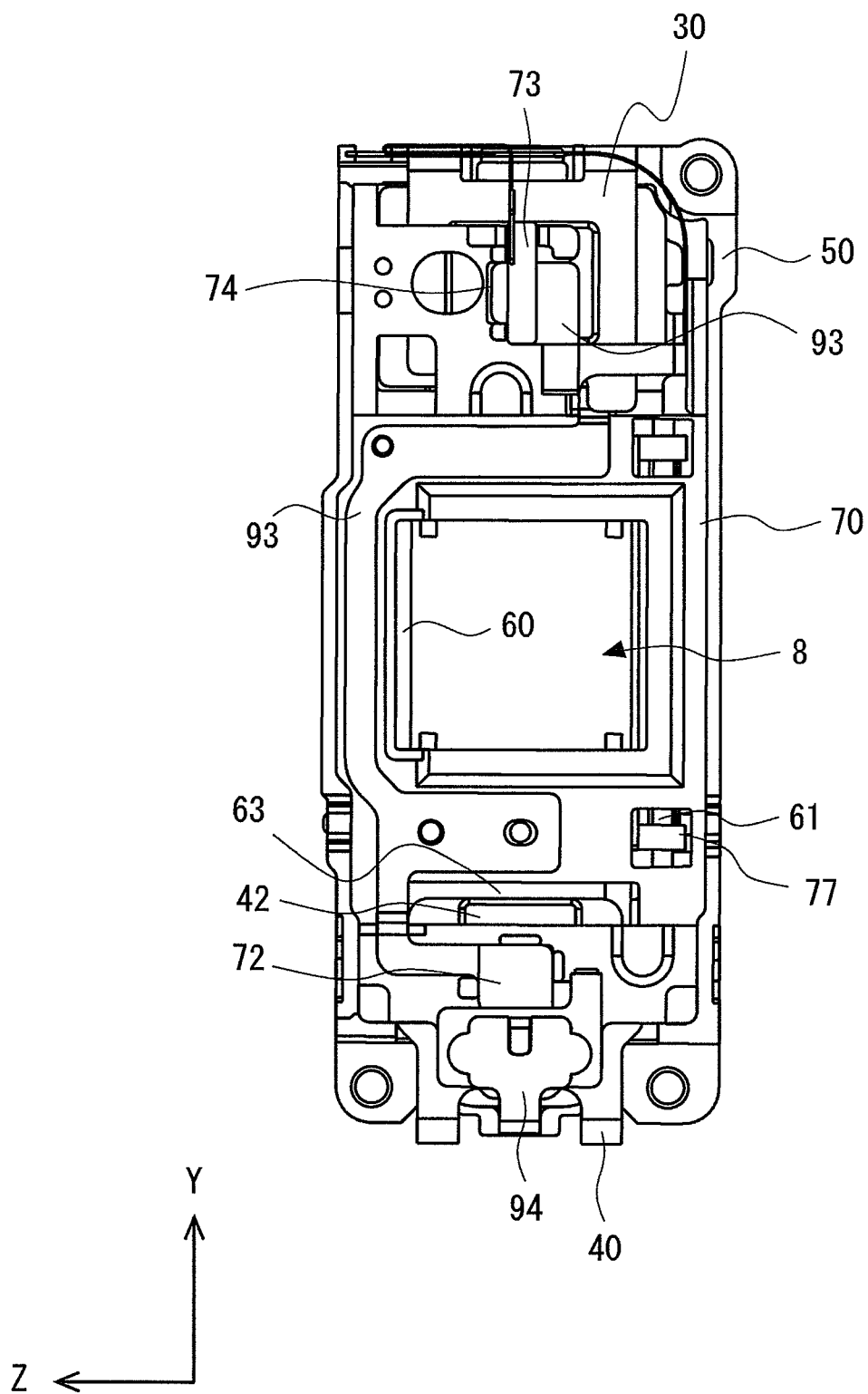
FIG. 15 is a rearview for explaining the position detection mechanism of the camera-shake correction mechanism according to the embodiment of the present invention.
Figure 16:
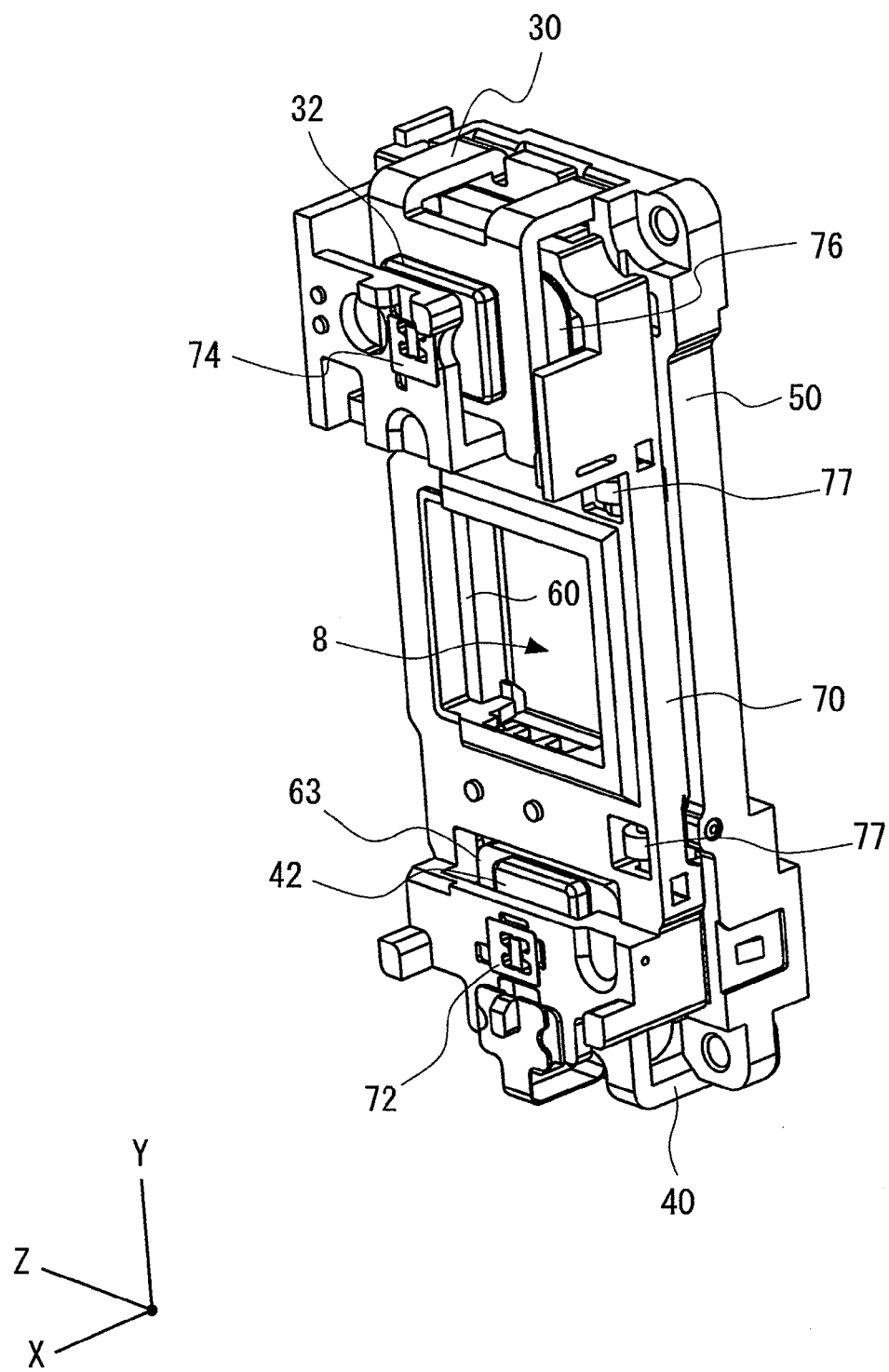
FIG. 16 is a perspective view for explaining the position detection mechanism of the camera-shake correction mechanism according to the embodiment of the present invention.
Figure 17:
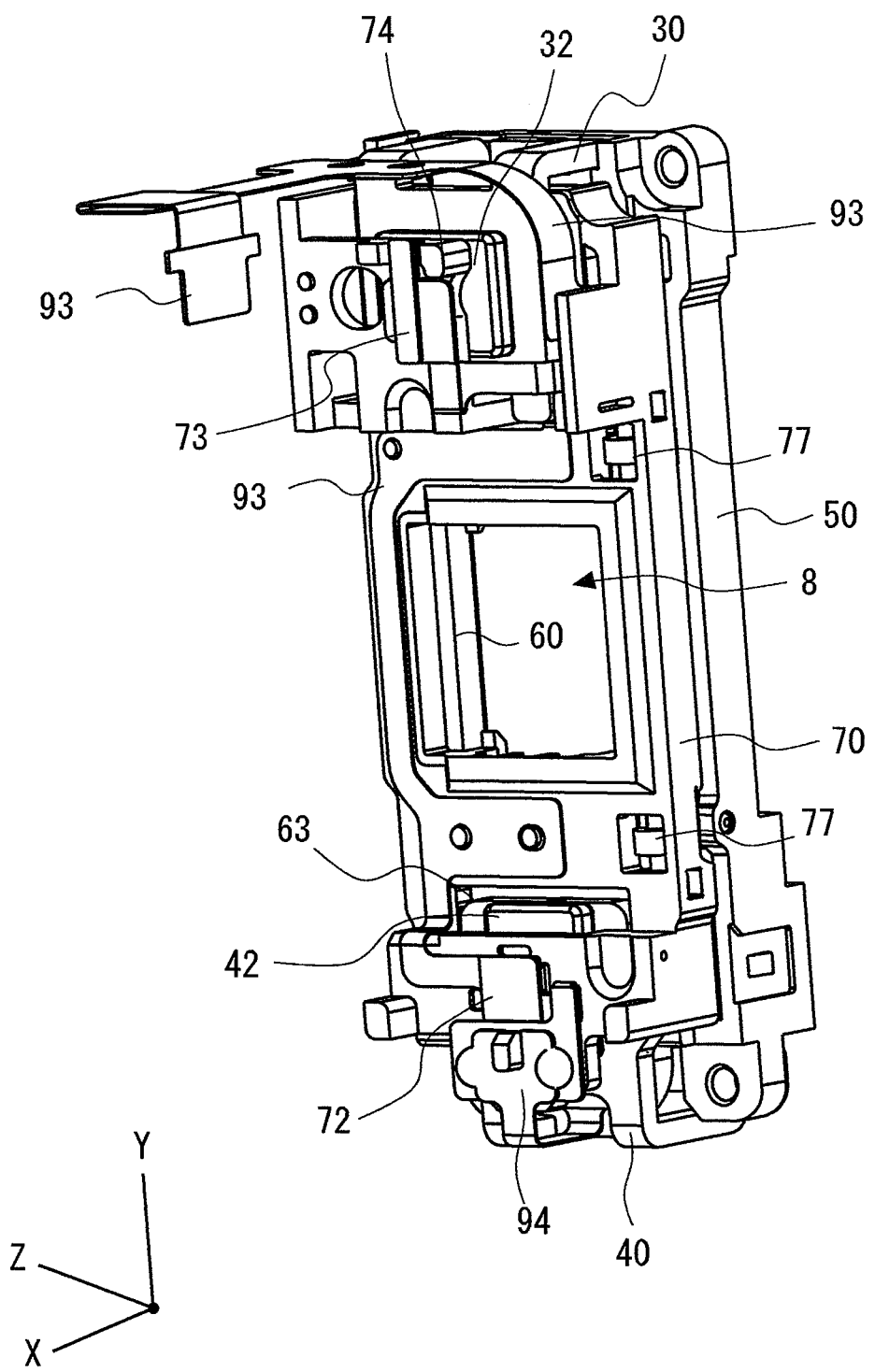
FIG. 17 is a perspective view for explaining the position detection mechanism of the camera-shake correction mechanism according to the embodiment of the present invention.
Figure 18:
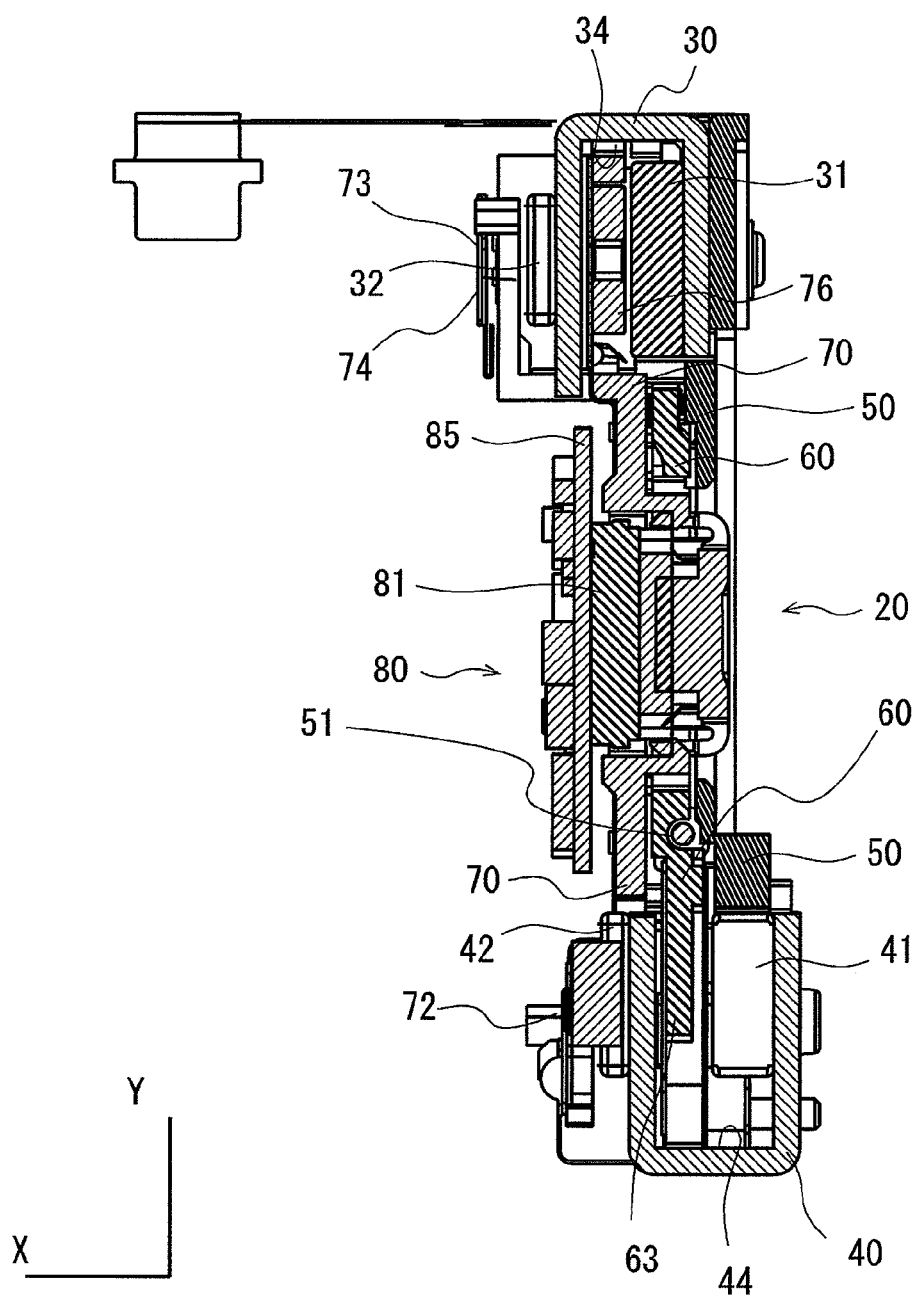
FIG. 18 is a side sectional view illustrating a held state by the upper holder according to the embodiment of the present invention.

A state where the upper holder 30 and the lower holder 40 are attached to the base plate 50 will be described by using FIGS. 14 to 18. FIGS. 14 and 15 are rear views illustrating a state where the z-plate 60 and the y-plate 70 are attached to the base plate 50 by the upper holder 30 and the lower holder 40, and FIGS. 16 and 17 are their perspective views. Moreover, in FIGS. 14 and 16, wiring boards 93 and 94 for supplying a current to the coil are omitted for clarification of the description. FIG. 18 is a sectional view of the camera-shake correction mechanism.

The upper holder 30 is fixed to the base plate 50, and the coil 76 of the y-plate 70 is inserted into the recess portion 34 of the upper holder 30. It is assumed that the magnetic field generated by the permanent magnet 31 and the current of the coil 76 cross each other at a right angle in the x-direction and the z-direction. By controlling the current flowing through the coil 76, the y-plate 70 is linearly moved in the y-direction with respect to the upper holder 30. At this time, the hall element 74 provided on the y-plate 70 and the permanent magnet 32 are arranged facing each other. When the y-plate 70 is moved in the y-direction with respect to the upper holder 30, the relative positions of the permanent magnet 32 and the hall element 74 are changed. The hall element 74 detects the change in the magnetic field. A displacement amount of the y-plate 70 with respect to the base plate 50 is detected by an output signal output from the hall element 74. In other words, the hall element 74 detects the position of the image pickup element 81.

The lower holder 40 is fixed to the base plate 50, and the coil 63 of the z-plate 60 is inserted into the recess portion 44 of the lower holder 40. It is assumed that the magnetic field of the permanent magnet 41 and the current flowing through the coil 63 cross each other at a right angle in the x-direction and the y-direction. By controlling the current flowing through the coil 63, the z-plate 60 is linearly moved in the z-direction with respect to the lower holder 40. At this time, the hall element 72 provided on the z-plate 60 and the permanent magnet 42 are arranged facing each other. When the z-plate 60 is moved in the z-direction with respect to the lower holder 40, the relative positions of the permanent magnet 42 and the hall element 72 are changed. The hall element 72 detects the change in the magnetic field. A displacement amount of the y-plate 70 with respect to the base plate 50 is detected by an output signal output from the hall element 72. In other words, the hall element 72 detects the position of the image pickup element 81. With this configuration, the image pickup element 81 can be feedback-controlled, and the camera-shake correction can be performed more effectively. The output signals of the hall element 72 and the hall element 74 are taken out through the wiring board 93.

(Holding Mechanism of Rotating Ball)

In order to hold the rotating ball 52 and the rotating ball 62 between the plates, the y-plate 70 is attracted to the base plate side. A configuration for holding the rotating balls 52 and 62 by attracting the y-plate 70 to the base plate 50 will be described below. The rotating balls are held by using a magnetic force by the permanent magnet 32 as the attractive force so that an interval between the base plate 50 and the y-plate 70 is constant.

As illustrated in FIGS. 17 and 18, the attracting yoke 73 is arranged on the rear surface side of the hall element 74. Specifically, the attracting yoke 73 is mounted on the wiring board 93. Therefore, the attracting yoke 73 and the permanent magnet 32 are arranged facing each other through the hall element 74. As a result, the attracting yoke 73 is attracted by the magnet force to the permanent magnet 32. The permanent magnet 32 is mounted on the base plate 50 through the upper holder 30, and the wiring board 93 is mounted on the y-plate 70. Thus, the permanent magnet 32 attracts the y-plate 70 to the base plate 50. A constant attractive force is generated by the magnetic force in the permanent magnet 32. The y-plate 70 can be prevented from being removed from the base plate 50, and the rotating ball 52 and the rotating ball 62 are held between the plates. Since the rotating balls 52 and 62 are held by the permanent magnet 32 used for position detection, the number of components can be reduced. As a result, the assembling process can be simplified, and productivity can be improved. The attracting yoke 73 may be formed of any material as long as it is attracted to the permanent magnet 32, and a ferromagnetic body or the like, for example, can be used.

Moreover, in this embodiment, both the rotating ball 52 and the rotating ball 62 are arranged on the upper side of the opening portion 8. Therefore, it is only necessary that the attraction by the magnetic force is performed only on the upper side of the opening portion 8. That is, since it is no longer necessary to attach the attracting yoke on the lower side of the opening portion 8, the number of components can be reduced. Moreover, the assembling process can be simplified, and productivity can be improved. The positions to arrange the rotating ball 52 and the rotating ball 62 are not limited to the upper side of the opening portion 8. That is, it is only necessary that they are arranged on one end side of the opening potion 8. With this configuration, the attractive force for preventing drop of the rotating balls 52 and 62 can be generated with a simple configuration.

Moreover, as illustrated in the side sectional view in FIG. 18, the upper holder 30 holds the y-plate 70 with respect to the base plate 50. The upper holder 30 is attached to the base plate 50 so that the y-plate 70 is inserted into the recess portion 34 of the upper holder 30 in a state where the base plate 50, the z-plate 60, and the y-plate 70 are overlapped with each other. That is, the end portion of the y-plate 70 the closest to the image pickup element 81 side in the base plate 50, the z-plate 60, and the y-plate 70 is inserted into the recess portion 34. As a result, the position of the y-plate 70 is regulated, and the gap between the base plate 50 and the y-plate 70 is prevented from exceeding the predetermined value.

That is, even if an external impact is applied to the image pickup apparatus 100, the rotating balls 52 and 62 can be prevented from dropping. In other words, if there is no upper holder 30, there is a concern that the attractive force by the magnetic force might be removed if an impact is applied. In this case, it is concerned that the rotating balls 52 and 62 might drop.

However, by using the upper holder 30, the z-plate 60 can be held on the base plate 50. Similarly, the lower holder 40 regulates the position of the z-plate 60. Thus, even if an external impact is applied to the image pickup apparatus 100, the rotating ball 62 can be prevented from dropping. The upper holder 30 and the lower holder 40 movably hold the z-plate 60 and the y-plate 70 on the both upper and lower sides. As a result, the z-plate 60 and the y-plate 70 can be reliably held with respect to the base plate 50, and the drop of the rotating balls 52 and 62 can be prevented. It is needless to say that the recess portion 34 and the recess portion 44 are designed having a dimension with which the rotating balls 52 and 62 do not drop.

(Arrangement of Actuator)

Figure 19:
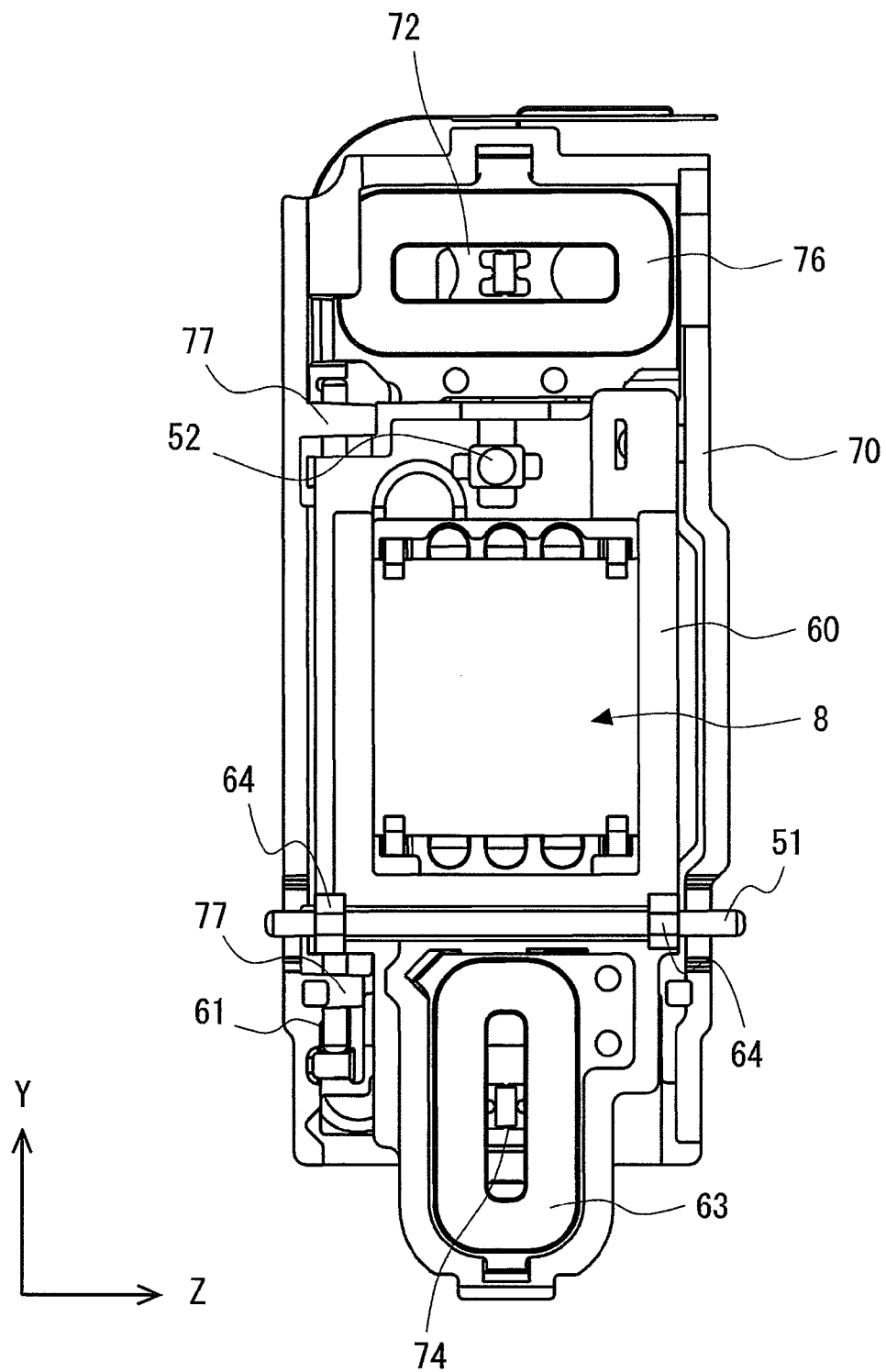
FIG. 19 is a front view illustrating arrangement of a coil according to the embodiment of the present invention.
Figure 20:
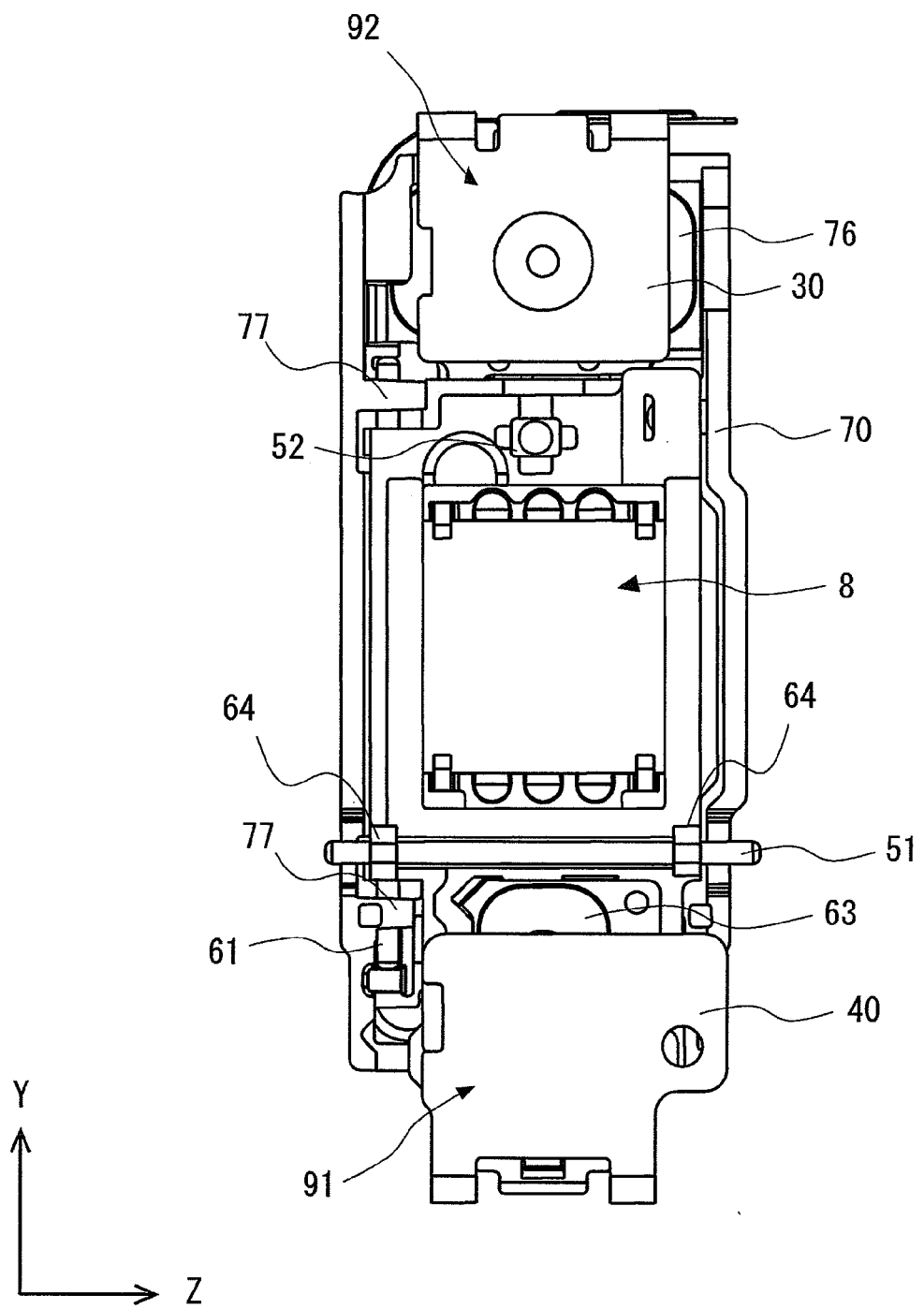
FIG. 20 is a front view illustrating arrangement of an actuator according to the embodiment of the present invention.

Subsequently, arrangement of the actuator for the movement in the y-direction and the z-direction will be described by using FIGS. 19 and 20. FIG. 19 is a z-y front view illustrating arrangement of the coil 76 and the coil 63, and FIG. 20 is a y-z front view illustrating a state in which the upper holder 30 and the lower holder 40 are attached to the configuration in FIG. 19.

As illustrated in FIG. 19, the coil 76 is arranged on the upper side of the opening portion 8, and the coil 63 is arranged on the lower side. As illustrated in FIG. 20, a motor using the coil 63 is referred to as an actuator 91, and a motor using the coil 76 is referred to as an actuator 92. The actuator 92 is composed of the coil 76 and the above-described permanent magnet 31, and the actuator 91 is composed of the coil 63 and the above-described permanent magnet 41.

The actuator 91 which drives the z-plate 60 in the z-direction is arranged on the lower side of the opening portion 8, and the actuator 92 which drives the y-plate 70 in the y-direction is arranged on the upper side of the opening portion 8. That is, the actuator 91 which is one of the actuators 91 and 92 arranged outside the opening portion 8 is arranged on one end side of the opening portion 8, while the other actuator 92 is arranged on the other end on the side opposite to that. In the y-z plan view, the opening portion 8 is arranged between the actuator 91 and the actuator 92.

In the y-z plan view, the actuator 91 and the actuator 92 are arranged facing each other so as to sandwich the opening portion 8. As described above, the actuators 91 and 92 are not arranged in a region between the upper end and the lower end of the opening portion outside the opening portion 8, that is, on the left side and the right side of the opening portion 8. With this configuration, the actuator is not arranged on either of the right and left sides of the opening portion 8. There is no more need to provide a space for arranging an actuator on the both sides of the opening portion 8 in the z-direction. Thus, the image pickup apparatus 100 can be made slim in the z-direction. It is needless to say that the image pickup apparatus 100 can be made slim in the vertical direction by arranging the actuators 91 and 92 on the right and left.

(Cover Unit 20)

Figure 21:
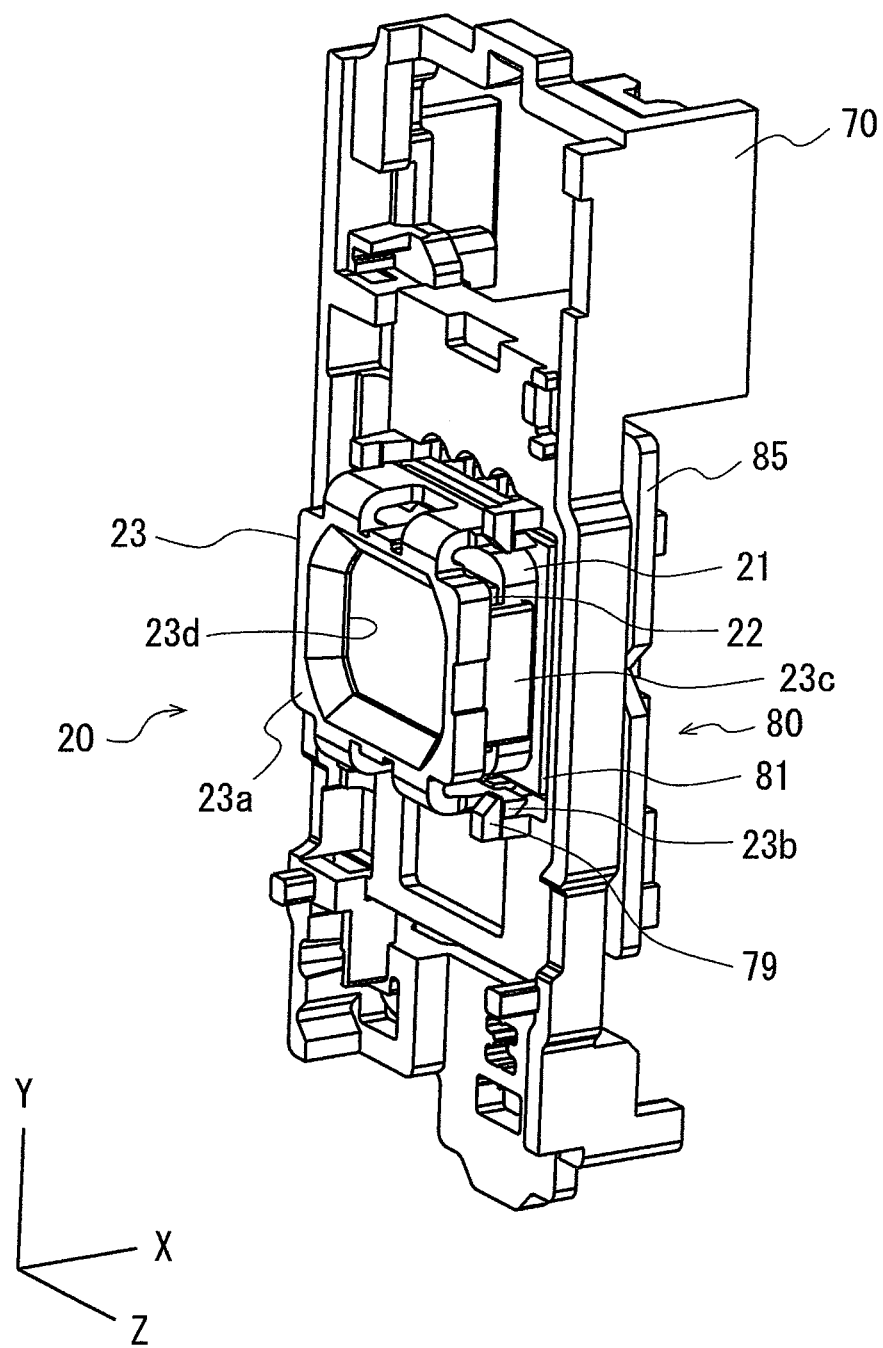
FIG. 21 is a perspective view illustrating a configuration of a cover unit according to the embodiment of the present invention.

Subsequently, a configuration of the cover unit 20 will be described by using FIGS. 21 to 23. FIG. 21 is a perspective view illustrating a state where the sensor unit 80 and the cover unit 20 are attached to the y-plate 70, FIG. 22 is its exploded perspective view, and FIG. 23 is its sectional view.

As illustrated in FIG. 21, a substrate 85 of the sensor unit 80 is fixed to the y-plate 70. The substrate 85 has the wiring, the control circuit, a storage circuit and the like connected to the image pickup element 81. For example, the substrate 85 of the sensor unit 80 is attached from the rear surface side of the y-plate 70, and the image pickup element 81 of the sensor unit 80 is arranged in the opening portion 70a of the y-plate 70. In other words, the image pickup element 81 is arranged on the y-plate located on the last in the base plate 50, the z-plate 60, and the y-plate 70 arranged between the lens unit 7 and the image pickup element 81. The image pickup element 81 is fixed to the substrate 85 by a photocurable resin or the like. On the front surface side of the sensor unit 80, the cover unit 20 for protecting the image pickup element 81 is arranged.

Figure 22:
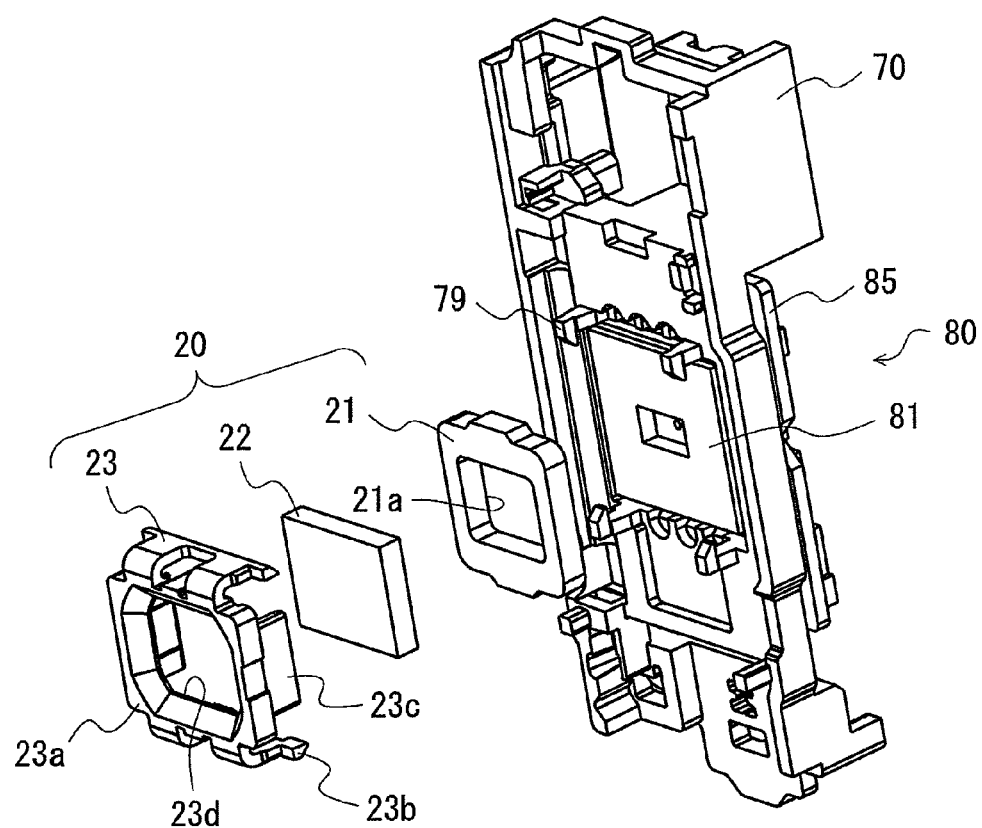
FIG. 22 is an exploded perspective view illustrating a configuration of the cover unit according to the embodiment of the present invention.
Figure 23:
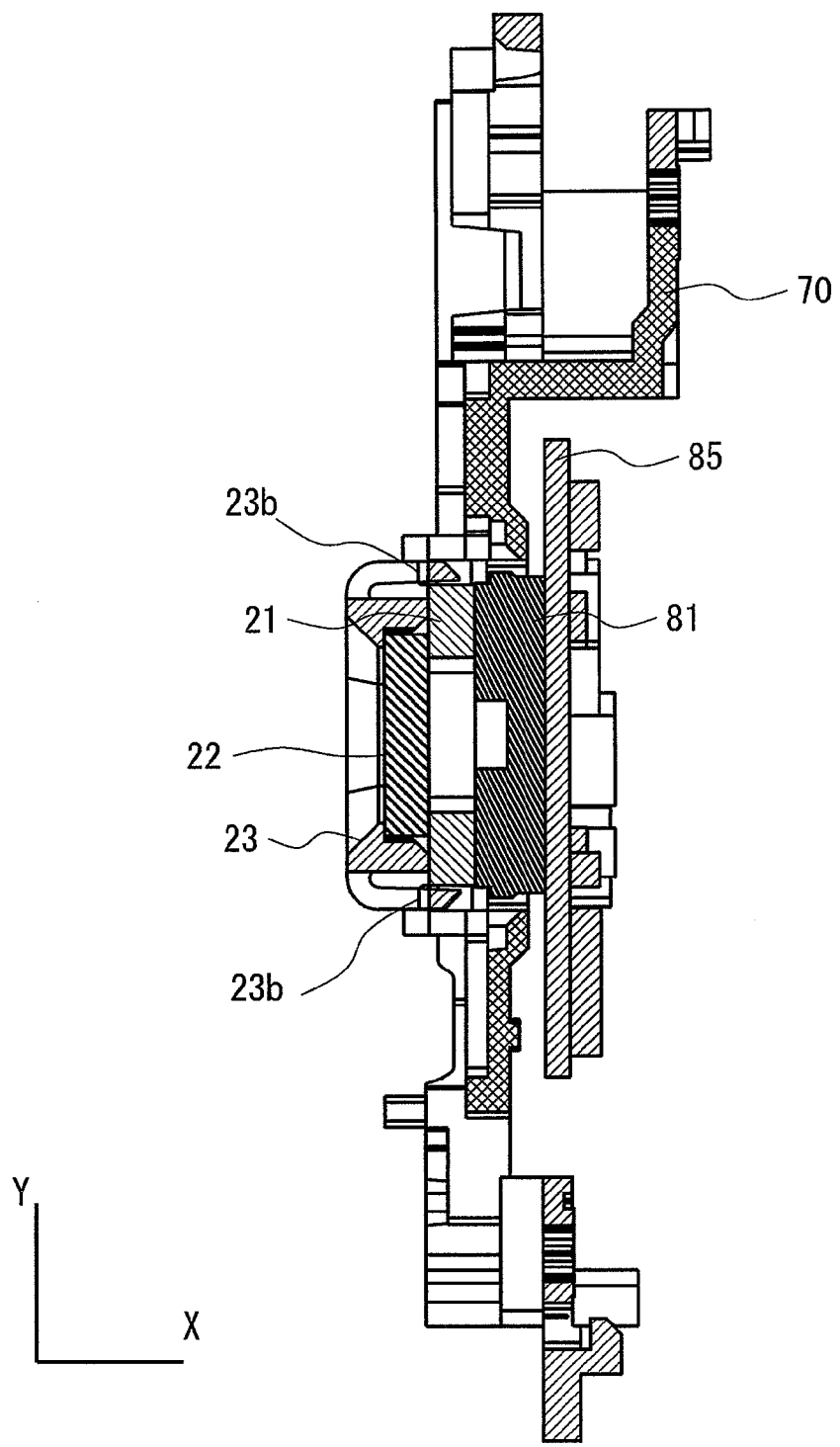
FIG. 23 is a side sectional view illustrating a configuration of the cover unit according to the embodiment of the present invention.

As illustrated in FIG. 22, the cover unit 20 (filter portion) has a frame body 21, a filter 22, and a holding frame 23. The frame body 21 is formed having a frame shape and has an opening portion 21a corresponding to a light receiving region of the image pickup element 81. The frame body 21 is formed of urethane foam such as Poron (registered trademark) and has a thickness of approximately 2.0 mm. It is needless to say that the material of the frame body 21 is not limited to urethane foam and the numeral value of the thickness is exemplification. For example, an elastic body such as rubber and resin can be used as the frame body 21. As the frame body 21, a dust-proof material is preferably used.

The filter 22 is a flat rectangular plate having a thickness of 1.4 mm, for example, and cuts infrared rays toward the image pickup element 81. Therefore, the filter 22 is an IR filter which shuts out the infrared rays having passed through the lens 6. The frame body 21 is arranged on a light receiving surface of the image pickup element 81, and the filter 22 is arranged on the frame body 21. That is, the frame body 21 is interposed between the filter 22 and the image pickup element 81. In the vicinity of the light receiving surface of the image pickup element 81, a space corresponding to the thickness of the frame body 21 is formed. In other words, on the light receiving surface of the image pickup element 81, the space corresponding to the opening portion 21a of the frame body 21 is generated. That is, the cover unit 20 positions the filter 22 with a predetermined interval from the light receiving region of the image pickup element 81.

The holding frame 23 attaches the frame body 21 and the filter 22 to the substrate 85. Specifically, the holding frame 23 has a frame portion 23a, a leg portion 23b, and a wall portion 23c. The frame portion 23a is formed having a frame shape and regulates an opening portion 23d. The leg portions 23b extend from two opposing sides of the frame portion 23a toward the substrate 85 side. Moreover, on two sides other than the two sides on which the leg portions 23b of the frame portion 23a are provided, the wall portions 23c are provided. The wall portions 23c are formed on the two sides in the y-direction and the leg portions 23b are formed on the two sides in the z-direction of the frame portion 23a. The wall portion 23c extends toward the substrate 85 side.

On the other hand, a pawl portion 79 for locking the leg portion 23b is formed on the y-plate 70. In a state where the frame body 21 and the filter 22 are sandwiched between the holding frame 23 and the substrate 85, the pawl portion 79 is locked with the leg portion 23b (See also FIG. 23). The cover unit 20 is fixed to the sensor unit 80. The holding frame 23 biases the frame body 21 through the filter 22. Therefore, the filter 22 and the frame body 21 can be held between the holding frame 23 and the substrate 85. Moreover, in this state, the filter 22 and the frame body 21 are arranged between the opposing two wall portions 23c. Thus, a shift of positions of the filter 22 and the frame body 21 can be prevented. The cover unit 20 is arranged in the opening portion 8.

Moreover, the frame body 21 having the frame shape is arranged in contact with the image pickup element 81. The filter 22 seals the space formed on the light receiving surface of the image pickup element 81 by the frame body 21. As a result, adhesion of dirt, dust or the like to the light receiving surface of the image pickup element 81 can be prevented. Moreover, the filter 22 and the light receiving surface are separated by a sufficient distance. If the frame body 21 having the thickness of 1.4 mm and the filter 22 having the thickness of 2.0 mm in the above-described example are arranged, the frame body 21 formed of urethane foam is somewhat contracted, and the distance between the front surface of the filter 22 and the light receiving surface of the image pickup element 81 becomes approximately 2.9 mm. The front surface of the filter 22 and the light receiving surface of the image pickup element 81 are separated by the thicknesses of the frame body 21 and the filter 22. Therefore, dusts and the like adhering to the surface on the side opposite to the sealed space of the filter 22 form an image only at an ignorable level on the light receiving surface of the image pickup element 81. Thus, an influence of dusts or the like can be reduced. Moreover, it is no longer necessary to provide a mechanism and the like for vibrating the image pickup element 81 in order to remove dusts adhering to the surface of the filter 22. As a result, the weights of components driven by the camera-shake correction mechanism 9 can be reduced.

Visible light having passed through the lens 6 passes through the opening portion 23*d*, passes through the filter 22, passes through the opening portion 21*a* and enters the image pickup element 81. As a result, an image of a subject can be taken by the image pickup element 81. By attaching the cover unit 20 as above to the y-plate 70, the cover unit 20 is also moved in accordance with movement for camera shake correction. Moreover, by arranging the cover unit 20 in the opening portion 8, the camera-shake correction mechanism 9 can be made slim and compact. Moreover, by using sponge such as urethane foam, weight reduction can be realized, and the image pickup element 81 can be driven at a high speed.

What is claimed is:

1. An image pickup apparatus having a camera-shake correction mechanism configured to perform camera shake correction by moving an image pickup element with respect to a lens unit, comprising:
    a base attached to the lens unit;
    a first plate provided slidably in a first direction with respect to the base;
    a first actuator configured to move the first plate in the first direction with respect to the base;
    a first shaft configured to connect the base and the first plate and guide movement of the first plate in the first direction; and
    a first rotating ball sandwiched between the base and the first plate in a rotatable state,
    wherein an opening portion through which a light beam traveling toward the image pickup element from the lens unit passes is provided in the base and the first plate,
    the opening portion is provided between the first shaft and the first rotating ball in a plan view orthogonal to an optical axis of the lens unit, and
    the first rotating ball is arranged outside the opening portion between one end and the other end of the opening portion in the first direction.

2. The image pickup apparatus according to claim 1, further comprising:
    a second plate provided slidably in a second direction with respect to the first plate;
    a second actuator configured to move the second plate in the second direction with respect to the first plate;
    a second shaft configured to connect the first plate and the second plate and guide movement of the second plate in the second direction; and
    a second rotating ball sandwiched between the first plate and the second plate in a rotatable state,
    wherein the opening portion is provided between the second shaft and the second rotating ball in a plan view orthogonal to the optical axis of the lens unit;
    the second rotating ball is arranged outside the opening portion in the vicinity of a center between one end and the other end of the opening portion in the second direction; and
    the first rotating ball is arranged outside the opening portion in the vicinity of the center between one end and the other end of the opening portion in the first direction.

3. The image pickup apparatus according to claim 1, wherein the first actuator includes:
    a magnet provided on the base; and
    a coil provided on the first plate.

* * * * *